United States Patent [19]

Asai et al.

[11] Patent Number: 5,214,743
[45] Date of Patent: May 25, 1993

[54] INFORMATION PROCESSING APPARATUS

[75] Inventors: Mitsuo Asai; Noboru Masuda, both of Kokubunji; Moritoshi Yasunaga, Kawaguchi; Masayoshi Yagyu, Kokubunji; Minoru Yamada, Hanno; Katsunari Shibata, Kokubunji, all of Japan

[73] Assignee: Hitachi, Ltd., Tokyo, Japan

[21] Appl. No.: 602,661

[22] Filed: Oct. 24, 1990

Related U.S. Application Data

[63] Continuation-in-part of Ser. No. 461,080, Jan. 4, 1990, Pat. No. 5,165,010.

[30] Foreign Application Priority Data

Oct. 25, 1989 [JP] Japan .................. 1-275834

[51] Int. Cl.$^5$ ............................................. G06F 15/18
[52] U.S. Cl. ...................................... 395/11; 395/24; 395/27
[58] Field of Search ............................... 395/11, 24, 27

[56] References Cited

U.S. PATENT DOCUMENTS

| | | | |
|---|---|---|---|
| 4,974,169 | 11/1990 | Engel | 395/11 |
| 5,131,072 | 7/1992 | Yoshizawa et al. | 395/24 |
| 5,142,666 | 8/1992 | Yoshizawa et al. | 395/27 |

FOREIGN PATENT DOCUMENTS 64787 3/1990 Japan .
64788 3/1990 Japan .
66688 3/1990 Japan .

OTHER PUBLICATIONS

Rumelhart et al; Parallel Distributed Processing; Chapter 8; pp. 318-362.
Yasunaga et al; IJCNN '89; Proceedings (vol. II pp. 213-217).
Eberhardt et al; IJCNN '89; Proceedings (vol. II pp. 183-190).
Yasunaga et al; IJCNN '90; Proceedings (vol. II pp. 527-535).

Primary Examiner—Allen R. MacDonald
Attorney, Agent, or Firm—Antonelli, Terry, Stout & Kraus

[57] ABSTRACT

An information processing apparatus which includes an input layer, a hidden layer and an output layer, and performs a computation in terms of models of neurons. A forward network, having the input layer, the hidden layer and the output layer, executes a computation for externally input data to determine the values of outputs therefrom, and a backward network, having the output layer and the hidden layer, executes computation for output values expected for given inputs to determine learning signal values. The information processing apparatus transfers the output values and learning values between the forward network and the backward network to modify the synapse weights of the neuron models.

23 Claims, 27 Drawing Sheets

FIG. 25

| MODE SIGNAL | OPERATION | | REMARKS |
|---|---|---|---|
| 0 | NO OPERATION | (FIG.12) | |
| 1 | WRITE FOR INPUT LAYER MEMORY 1010 | (FIG.12) | WRITE ON INITIAL VALUES |
| 3 | WRITE FOR TEACHER SIGNAL MEMORY 1012 | (FIG.12) | |
| 5 | WRITE FOR SEQENCE RAM 1013 | (FIG.12) | |
| 8 | OUTPUT LAYER MEMORY 1011 | (FIG.16) | |
| 9 | WRITE FOR CONVERSION TABLE 1070 | (FIG.21) | |
| 11 | WRITE FOR LATCH 1507 | (FIG.21) | |
| 13 | WRITE FOR LATCH 1506 | (FIG.22) | |
| 15 | WRITE FOR LATCH 1604 | (FIG.23) | |
| 17 | WRITE FOR LATCH 1701 | (FIG.18) | |
| 19 | WRITE FOR MEMORY 1160 | (FIF.18) | |
| 24 | WRITE FOR LATCH 1123 (TEACHER SIGNAL t) | (FIG.18) | LEARNING OPERATION |
| 25 | RESET OF POINTOR 1160 | | |
| 26 | x BROADCAST, $x = f(\Sigma w \cdot x)$, xSNOOP | | |
| 27 | $x'(=f'(u))$ BROADCAST, $x'$ SNOOP | | |
| 28 | $\delta = S \cdot f'(u)$ | | |
| 29 | $\delta$ BROADCAST, $S = \Sigma w \cdot \delta$, $\delta$ SNOOP | | |
| 30 | $\delta = S \cdot f'(u)$ | | |
| 31 | xBROADCAST, $w^{n+1} = w^n + \Delta w^{n+1}$ | | |
| 32 | $\delta$ BROADCAST, $w^{n+1} = w^n \Delta w^{n+1}$ | | |

FIG. 26

| ADDRESS ON MEMORY | MODE | BOARD ADDRESS | NEURON ADDRESS | REMARKS |
|---|---|---|---|---|
| 0 | 24 | 1 | 5 | WRITE OF TEACHER SIGNAL |
| 1 |  |  | 6 |  |
| 2 | 25 |  | — | POINTER RESET |
| 3 | 26 | 0 | 0 | BROADCAST OF INPUT LAYER NEURON (INPUT LAYER MEMORY) |
| 4 |  | 0 | 1 |  |
| 5 |  | 0 | 2 |  |
| 6 |  | 3 | 3 | BROADCAST OF HIDDEN LAYER NEURON |
| 7 |  |  | 4 |  |
| 8 |  |  | 5 | BROADCAST OF OUTPUT LAYER NEURON, TAKE-IN FOR OUTPUT MEMORY |
| 9 |  |  | 6 |  |
| 10 | 27 |  | 3 | BROADCAST OF HIDDEN LAYER NEURON |
| 11 |  |  | 4 |  |
| 12 |  |  | 5 | BROADCAST OF OUTPUT LAYER NEWRON |
| 13 |  |  | 6 |  |
| 14 | 28 |  | — | COMPUTATION OF TEACHER SIGNAL δ FOR OUTPUT LAYER NEURON |
| 15 | 25 |  | — | POINTER RESET |
| 16 | 29 | 4 | 5 | BROADCAST IN δ IN OUTPUT LAYER NEURON |
| 17 |  | 4 | 6 |  |
| 18 | 30 |  | — | COMPUTATION OF δ IN HIDDEN LAYER NEURON |
| 19 | 29 | 4 | 3 | BROADCAST OF δ IN HIDDEN LAYER NEURON |
| 20 |  | 1 | 4 |  |
| 21 | 25 |  | — | POINTER RESET |
| 22 | 31 | 3 | 0 | MODIFICATION OF SYNAPSE WEIGHT w ON FORWARD NETWORK SIDE |
| 23 |  |  | 1 |  |
| 24 |  |  | 2 |  |
| 25 |  |  | 3 |  |
| 26 |  |  | 4 |  |
| 27 | 25 |  | — | POINTER RESET |
| 28 | 32 | 4 | 5 | MODIFICATION OF SYNAPSE WEIGHT w ON BACKWARD NETWORK SIDE |
| 29 | 32 |  | 6 |  |

INFORMATION PROCESSING APPARATUS

CROSS-REFERENCE TO RELATED APPLICATIONS

The present application is a continuation-in-part of a co-pending U.S. patent application Ser. No. 07/461,080 filed Jan. 4, 1990, now U.S. Pat. No. 5,165,010, the contents of which are incorporated herein by reference.

BACKGROUND OF THE INVENTION

The present invention relates to an information processing apparatus including a neural network which can learn at high speed various processing such as speech recognition, image processing, control,, etc. More particularly the present invention relates to an information processing apparatus which is conveniently constructed on a wafer-scale integrated circuit (WSI) and can provide a compact-sized low-cost large-scale neural network with high speed learning function.

Generally, a neural network is applied perform an information processing such as recognition, and knowledge processing. The neural network, when an input and a desired output are given, can be self-organizing through learning. Therefore, it does not require any program, and so several kinds of applications are possible.

One of the previously known algorithms used in the learning is a technique of "back propagation" disclosed in Parallel Distributed Processing, Chapter 8, pages 318-362 by Rumelhart et al. The "back propagation" will be explained below.

FIG. 2 shows a model j of a neuron. A plurality of neurons constitute a neural network. The neuron shown in FIG. 2 is input with inputs $x_i$'s from other neurons. The respective inputs are weighted with synapse weights $w_{ji}$, and the internal energy (inner product) $u_i$ which is a sum of the weighted inputs is computed. This value $u_i$ is converted by e.g. a sigmoid function f to provide an output $x_j$. It is assumed that the synapse weight $w_{ji}$ is a weight to be charged to the input neuron i in the neuron j.

$$x_j = f(u_j) \quad (1)$$

$$u_j = \sum_i w_{ji} \cdot x_i \quad (2)$$

Coupling a plurality of neurons provides a neural network, and also changing the synapse weight $w_{ji}$ permits several information processings to be executed.

FIG. 3 shows a hierarchical neural network. Although the neural network shown is composed of three layers of an input layer, a hidden layer and an output layer, the hidden layer may be composed of plural layers. The neural network as shown in FIG. 3 has two operation modes. One is a forward mode for information-processing an input to provide an output. The other is a backward mode for externally supplying an expected output value to a given input to modify the synapse weight $w_{ji}$ from the output layer toward the input layer; then the modification value $\Delta w_{ji}$ for the synapse weight $w_{ji}$ is assumed for the neuron j as $$\Delta w_{ji}^{n+1} = \eta \delta_j x_i + \alpha \Delta w_{ji}^n \quad (3)$$

where n is the number of learnings, and $\alpha$ and $\eta$ are contents. The function $\delta$ is determined as follows.

Assuming that an expected value is $t_k$, in the neuron k in the output layer, $$\delta_k = (t_k - x_k) f'(u_k) \quad (4),$$

and in the neuron j in the hidden layer, $$\delta_j = f'(u_j) \sum_k \delta_k w_{kj} \quad (5)$$

where the function f' is a derived function of the function f.

In this way, the modification value $\Delta w$ is determined to modify the synapse weight w. This learning is repeated until the output from the output layer reaches the desired value.

Generally, information concerning the characteristics of a neural network and the research of its application have been carried out through simulation by software on a sequential computer. This technique requires very long computation time in order to execute the learning of a neural network composed of a huge number (e.g. several thousands or several tens thousands of) neurons. In many cases, the learning requires a very large number of repetitions. Thus, the capability of a large scale neural network has not yet been sufficiently uncovered.

On the other hand, several attempts have been made to compute the neural network using dedicated hardware at high speed. One of them is a system disclosed in "A wafer Scale Integration Neural Network Utilizing Complete Digital Circuits" IJCNN '89 Proceedings (Vol. II pp. 213-217), as shown in FIG. 4.

In FIG. 4, 201's are neuron computation units, and 210 is a bus, the neuron computation units are connected with each other through the bus 210. In operation, one of the neuron computation units 201 is selected and its output values are output to the bus 211. Each of the neuron computation units 201, which holds the synapse weights for the output neuron in its memory, weights the values sequentially input through the bus 211 with the synapse weights read from the memory, and cumulatively adds the products thus formed. The neuron computation unit 201 outputs the its value, after converted into a sigmoid function of Equation (1) to the bus 211. A weighting circuit is operated in a time-divisional manner. When each of the neuron computation units 201 completes output of its values, all of the neuron computation units 201 can compute Equation (2). Hereinafter, such a computation technique is referred to as a time-divisional bus connection system.

The time-divisional computation system, due to its operation, permits the operation of a neuron expressed in Equations (1) and (2) to be computed at high speed. Another feature of the time-divisional computation system is that the system shown in FIG. 4 can be realized on the wafer scale integrated circuit (WSI). By using the weighting circuit in a time-divisional manner, the time divisional bus connection system can greatly reduce the area occupied by one neuron computation unit. Thus, the area occupied by one computation unit is made as small as possible to enhance the production yield for one computation unit; the percentage of the computation units which cannot operate owing to a defect is decreased so that the system shown in FIG. 4 can be implemented. The system implemented in WSI permits a large scale neural network to be executed in a compact size and at high speed as compared to the prior art.

SUMMARY OF THE INVENTION

An object of the present invention is to provide a small-sized information processing apparatus constituted by a neural network allowing high speed learning.

Combining the time-divisional bus connection system with the back propagation technique can realize a small-sized information processing apparatus constituted by a large-scale neural network allowing high speed learning.

In the neural network in which neurals are completely coupled with each other, the number of weightings required to calculate Equations (1) and (2) once is about $N^2$ (N: number of neurons). In the time-divisional bus connection system, in which N number of weighting circuits are simultaneously operated, the time required for computation is N; this permits a large scale neural network to be computed at high speed.

However, mere combination of the time-divisional bus connection system and the back propagation cannot improve the performance of computation in the neural network. In order to attain the satisfactory learning performance, the following problems must be solved.

When the back propagation is executed in the time-divisional connection system, in calculating Equations (3) to (5) in the backward mode operation, a synapse weight at the output layer neuron is required to compute the function 6. For example, in order to compute $\delta_j$ for the neuron j in the hidden layer, the synapse weight $w_{kj}$ of the output layer neuron k for the hidden layer neuron k is required. However, as described previously, the computation unit 201 for the neuron holds only the synapse weight $w_{ji}$ of the hidden layer neuron j for the input layer neuron i. Therefore, Equation (5) cannot be computed in parallel and so $\delta_k w_{kj}$ will be computed sequentially one by one. Thus, although the time required for the forward calculation is N, that for the backward calculation is $N^2$; this is an obstacle to executing the learning at high speed.

In order to solve the above problem, in accordance with the present invention, a neural network for executing the forward calculation and another neural network for computing the functions δ in the backward direction are provided. Each of the networks stores the synapse weights for convenience to execute their computation in parallel. Thus, although the same synapse weights are doubly stored, they are modified in the individual network to provide the same modified value.

The present invention is suitably applied to a dedicated computer for learning at high speed the neural network executing both forward and backward calculations such as a back propagation learning algorithm. In accordance with the present invention, Equations (1) and (2) are computed in a forward network while Equations (3) and (4) are computed in a backward network. The synapse weight are stored in both networks so as to have the same value. The values required to calculate the modification value of Equation (3) are computed in both networks. In accordance with the present invention, the communication means provided between the two networks permits the units constituting each network to obtain the value required to modify the synapse weight and each of the networks to modify the synapse weight to the same value. The forward network is constituted for convenience to compute Equations (1) and (2) individually in parallel whereas the backward network is constituted for convenience to compute Equations (4) and (5) individually in parallel. Equation (3) is also computed in parallel in each unit of each of the networks. Therefore, in accordance with the present invention, the above learning can be executed within the computation time of N.

Further, the forward and backward computations are performed in different networks so that each of the computation units can be realized with a small area. Thus, the neural network, when WSI is adopted, can enhance the production yield per one computation unit.

Further, the computation units for both forward and backward computations can be designed in the same circuit construction so that the man-power for design can be decreased. Then, in which network the computation unit is to be operated will be determined in accordance with a control signal. In this case, when WSI is adopted in the neural network, one kind of WSI has only to be designed and fabricated so that it can be fabricated at low cost. Further, if a plurality of WSI's are prepared and connected with each other, a larger scale neural network can be easily fabricated.

In accordance with the present invention, the neural network can be trained at high speed. The neural network is conveniently constituted in a wafer scale integrated circuit (WSI) and also be constituted on plural wafers. Further, the design man-power can be also greatly reduced. Accordingly, the wafer scale integrated circuit can be fabricated to provide a small-sized neuro-computer which can simulate a large scale neural network at high speed.

BRIEF DESCRIPTION OF THE DRAWINGS

FIG. 25 is a table showing mode signals and their exemplary operation; and

FIG. 26 is a table showing an example of instructions for writing addresses in the sequence RAM of FIG. 24.

DESCRIPTION OF THE PREFERRED EMBODIMENTS

Figure 1:
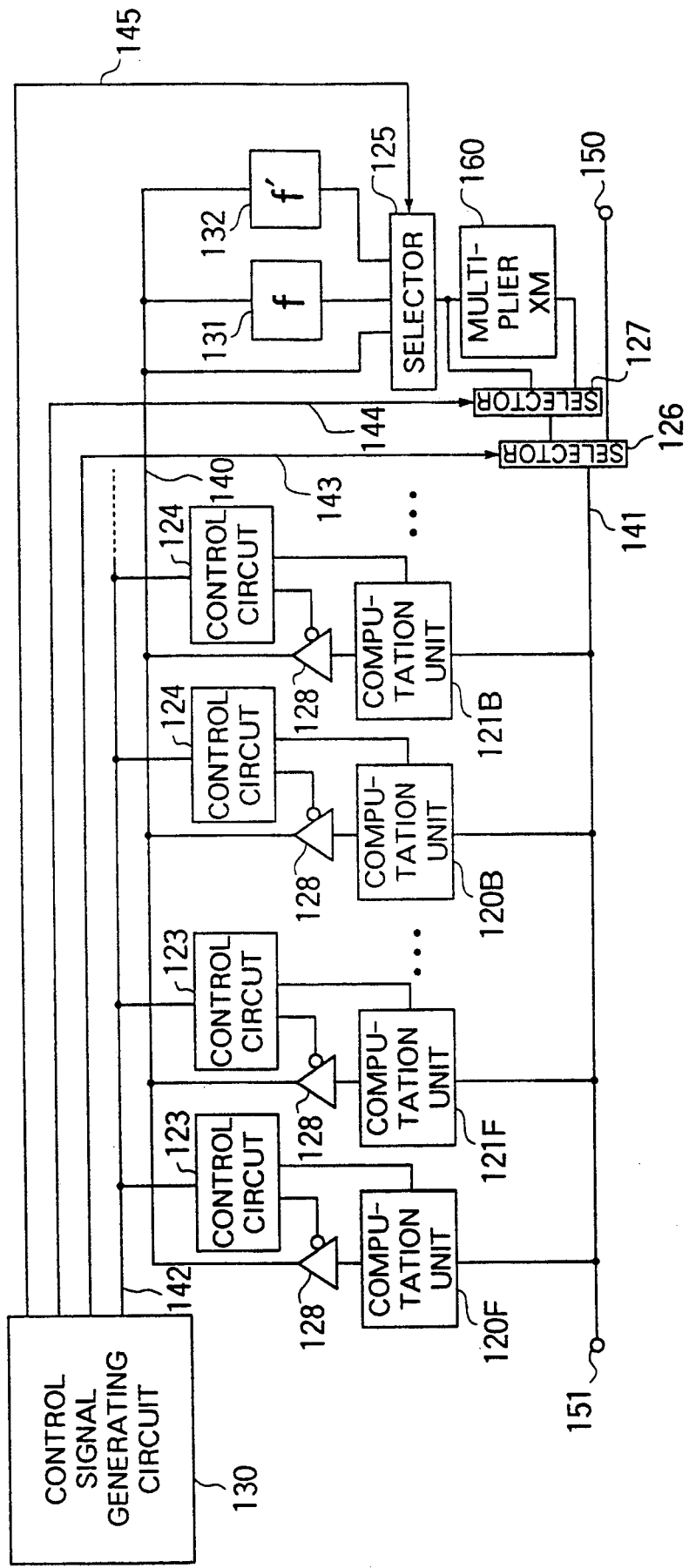
FIG. 1 is a block diagram showing one embodiment of the present invention.

Now referring to the drawings, explanation will be made of the present invention in connection with several embodiments.

FIG. 1 is a view showing one embodiment of the present invention. In FIG. 1, 120F, 121F, 120B and 121F are computation units, and 123's and 124's are control circuits. Each of the computation units is connected with the control circuit 123 or 124. 130 is a control signal generating circuit for generating a control signal onto control signal lines 142 to 145, respectively. Each of the control circuits 123 and 124 receives the control signal from the control signal line 142. 140 is an output bus. 128's are buffers each of which, is controlled by the control circuit 123 or 124 which controls whether the output value from each computation unit should be sent to or separated from the output bus 140. 131 is a function converter circuit which serves to convert the value input from the output bus 140 in accordance with a sigmoid function f expressed by Equation (1). 132 is a function converter circuit which serves to convert the value input from the output bus 140 in accordance with a derivative function f' of the sigmoid function f. 125 is a selector for selecting the output bus 140, the output from the function converter 31 or the output from the function converter 132 in accordance with the control signal on the control signal line 145. 160 is a multiplier for multiplying the output from the selector 125 by a constant $\eta$. 127 is a selector for selecting the output from the selector 125 or the output from the multiplier 160 in accordance with the control signal line 144. 150 is an external input bus and 141 is an input terminal. 126 is a selector which serves to select the output from the selector 127 or the signal input from the external input terminal 150 in accordance with the control signal on the control signal line 143 to output the selected signal to the input bus 141. Each of the computation units, which is connected with the output bus 140, can input the signal output to the input bus 141. 151 is an external output terminal for outputting the value output to the input bus 141.

Figure 5:
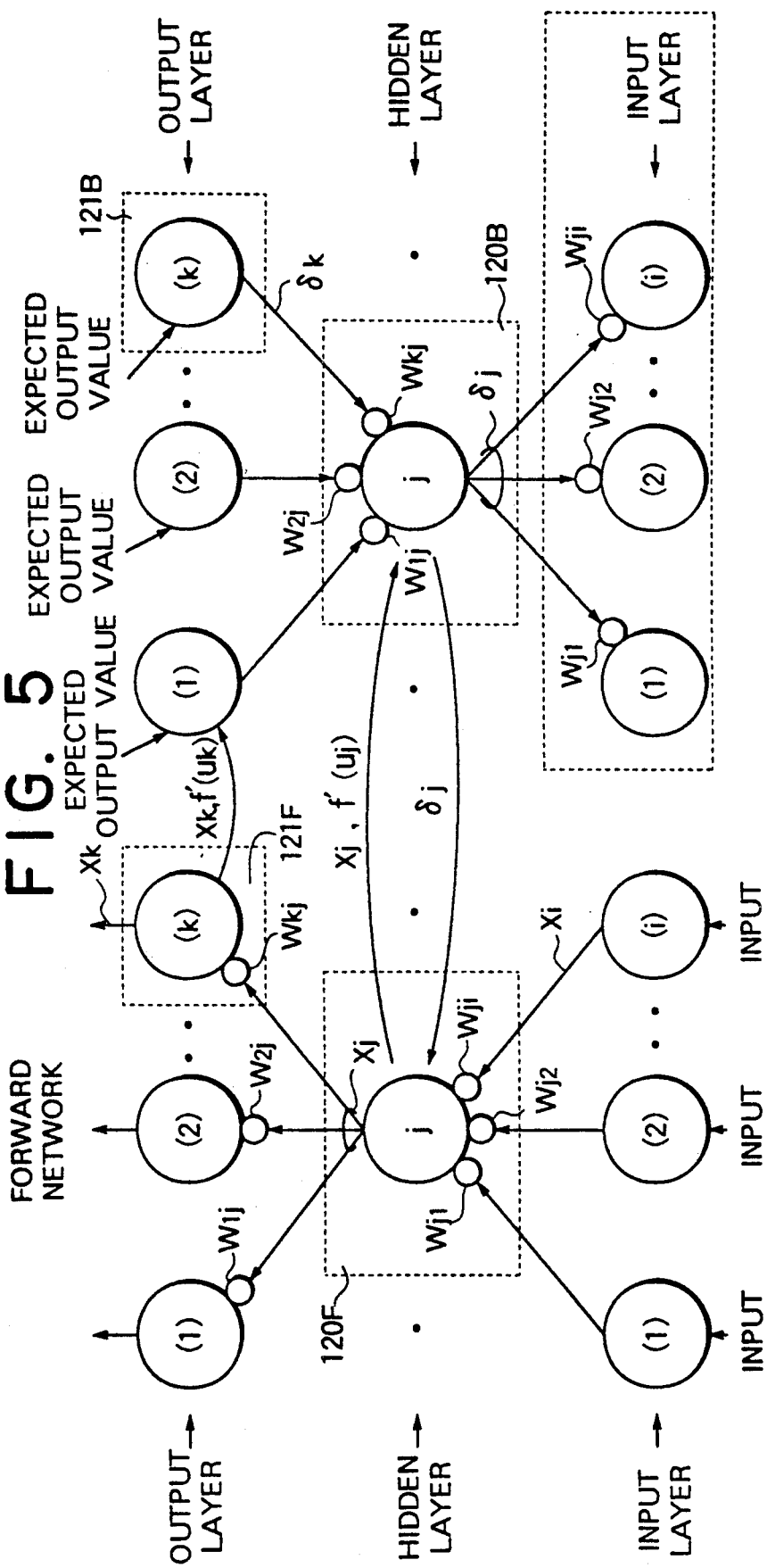
FIG. 5 is a view for explaining the operation of the present invention in detail.

FIG. 1 shows an arrangement of the present invention for computing Equations (1) to (5) at high speed. The details of each of the computation units will be described later with reference to FIGS. 7 to 9. The operation of the arrangement of FIG. 1, mainly that of a neuron j will be explained below with reference to FIG. 5 showing the detail thereof. Incidentally, an input layer may be constructed as a layer for only temporarily storing input data, or as computation units for neurons as shown in FIG. 5. Respective computation units in FIG. 5 correspond to the neuron shown in FIG. 2; specifically the computation units 120F, 121F, 120B and 121B in FIG. 1 are identical to those in FIG. 5. In FIG. 5, the computation units 120F and 121F constitute a forward network for executing a forward operation whereas the computation units 120B and 121B constitute a backward network for executing a backward operation. It should be noted that Equations (1) and (2) are computed by the forward network, Equations (4) and (5) are computed by the backward network and Equation (3) is computed by both networks.

In the forward network, the computation unit in its hidden layer holds synapse weight $w_{ji}$ for a neuron i in its input layer, and the computation unit in an output layer holds the synapse weight, $w_{kj}$ for the neuron j in the hidden layer; the computation unit 120 F holds the synapse weight $w_{ji}$. On the other hand, in the backward network, the computation unit in its hidden layer holds the synapse weight $w_{jk}$ which is held for the neuron j by the computation unit in the output layer in the forward network, and the computation unit in its input layer holds the synapse weight $w_{ji}$ which is held for the neuron in the input layer by the computation unit in the hidden layer in the forward network; the computation unit 120B in the hidden layer holds the synapse weight $w_{kj}$. The synapse weights $w_{ji}$ and $w_{kj}$ held by the forward network which correspond to those held by the backward network have the same values.

In the forward network, the corresponding outputs $x_i$, $x_j$ and $x_k$ from the computation units in the input layer, the hidden layer and the output layer will be sequentially determined. Specifically, the computation unit 120F, in response to input of the output $x_i$ from the input layer, weights it with the synapse weight $w_{ji}$ therefor to compute the internal energy $u_j$ and non-linearly converts the value thus computed to output the output value $x_j$. The computation unit in the output layer, in response to input of the output $x_j$ from the hidden layer, weights it with the synapse weight $w_{kj}$ therefor to compute the internal energy $u_k$ and non-linearly converts the value thus computed to output the output value $x_k$. The computation units in the forward network send the output values $x_i$, $x_j$ and $x_k$ to the corresponding computation units in the backward network; the computation unit 120F sends its output $x_j$ to the computation unit 120B. Next, the respective computation units in the hidden layer and the output layer in the forward network send the differentials $x_j'$ and $x_k'$ of their output values $x_j$ and $x_k$ to the corresponding computation units in the backward network; the computation unit 120F sends the differential $x_j'$ (=f'($u_j$)) to the computation unit 120B.

Meanwhile, if the output value $x_k$ from the output layer in the forward network is different from an expected value $t_k$, the synapse weights must be modified. This modifying operation will explained below.

First, each of the computation units in the output layer in the backward network computes $\delta_k$ in accordance with Equation (4) and the value thus computed to each of the computation units in the hidden layer; $x_k'$ necessary to compute Equation (4) is previously input. In the backward network, each of the computation units in the hidden layer, in response to input of $\delta_k$, computes a modification value $\Delta w_{kj}$ using the value of $\delta_k$ in accordance with Equation (3) to modify the synapse weight $w_{kj}$. Further, the computation units in the output layer in the backward network send their output value $\delta_k$ to the corresponding computation units in the forward network. Therefore, the computation units in the output layer in the forward network can compute the modification value $\Delta w_{kj}$ in accordance with Equation (3) to modify the synapse weight $w_{kj}$.

In the backward network, the computation unit in the hidden layer multiplies the output value $\delta_k$ from each of the computation units in the output layer by the synapse weight to determine $\delta_j$ in accordance with Equation (5). In this case, the value $x_j'$ necessary to compute Equation (5) is previously input. Each of the computation units in the input layer, in response to input of $\delta_j$, computes a modification value $\Delta w_{ji}$ using the value of $\delta_j$ in accordance with Equation (3) to modify the synapse weight $w_{ji}$. Further, the computation units in the hidden layer in the backward network send their output value $\delta_j$ to the corresponding computation units in the forward network. Therefore, the computation units in the hidden layer in the forward network can compute the modification value $\Delta w_{ji}$ in accordance with Equation (3) to modify the synapse weight $w_{ji}$.

As described above, in accordance with the present invention, x and x' ($=f'(u)$) in Equations (1), (2), (4) and (5) are computed in the forward network convenient to compute them at high speed, whereas $\delta$ in Equations (4) and (5) is computed in the backward network convenient to compute it at high speed. The modification value $\Delta w$ in Equation (3) is computed for the weight held in each of the computation units in both networks by that computation unit. Each computation unit in the forward network require $\delta$ to compute the modification value $\Delta w$, whereas each computation unit in the backward network requires x and x' to compute $\delta$ and $\Delta w$. Therefore, these data must be communicated between the corresponding computation units in both networks; the amount of data to be communicated corresponds to the number of neurons and so the data transfer can be made in a short time of N.

Although FIG. 5 has been explained assuming that only one layer is provided for the hidden layer, the same learning can be executed for the neural network with plural hidden layers.

Figure 6:
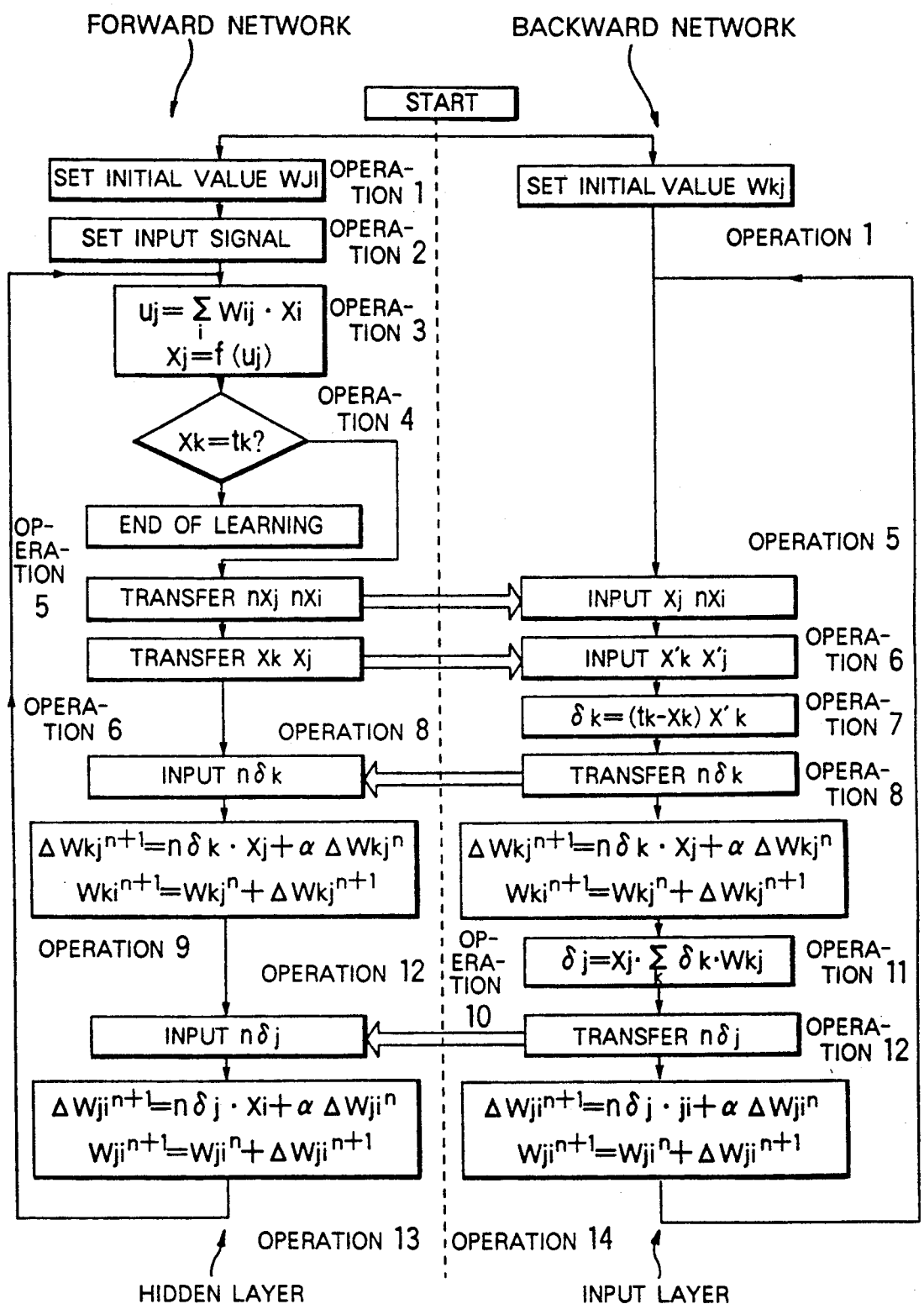
FIG. 6 is a flowchart showing the flow of the operation of the present invention.

Now referring to FIG. 1, the technique of implementing the above operations on hardware will be explained below. FIG. 6 is a flowchart showing the flow of the above operations, i.e. the computation procedure in the computation units in both forward and backward networks. The computation unit j in the forward network corresponds to the computation unit 120F in FIGS. 1 and 5 whereas the computation unit i in the backward network corresponds to the computation unit 120B in FIGS. 1 and 5. FIG. 1 will be explained below with reference to FIG. 6.

Each of the computation units holds in its memory the synapse weight for the neuron to be input. First, an initial value of the synapse weight is stored in each of the computation units. Specifically, stored in the computation unit 120F is the synapse weight $w_{ji}$ for the neuron i in the input layer, whereas stored in the computation unit 120B is the synapse weight $w_{kj}$ which is equal to the weight for the neuron j in the hidden layer in the forward network held by the computation unit k in the output layer (Operation 1).

The selector 126 is set to output an input value from the external input terminal 150 to the input bus 141 to write the input value in each of the computation units in the input layer in the forward network (Operation 2).

The control signal generating circuit 130 generates control signals onto the control signal lines 143 to 145 so that the selector 125 is set to output the output bus 140, the selector 127 is set to output the output from the selector 125, and the selector 126 is set to output the output from the selector 127. Next, the control signal generating circuit 130 generates onto the control signal line an address of each of the computation units i in the input layer in the forward network. Each of the control circuits 123 decodes the address, and, if the address coincides with the address of the corresponding computation unit, places the buffer 128 in an enable state, thus outputting onto the output bus 140 the output value $x_i$ from the computation unit i in the input layer in the forward network. The computation unit i in the input layer in the forward network only outputs the input value. The computation unit j in the hidden layer in the forward network sequentially inputs the output $x_i$ from the input layer in the forward network to weights it with the synapse weight therefor and cumulatively adds the product thus provided. When the control signal generating circuit 130 completes to address the computation units in the input layer in the forward network, each of the computation units in the hidden layer can compute Equation (2) to determine its output value $u_j$.

Next, after the control signal generating circuit 130 set the selector 125 so that it outputs the output from the function converter circuit 131, it generates on the control signal line 142 the address of each of the computation units in the hidden layer in the forward network. The addressed computation unit j outputs its output value $u_j$ onto the output bus 140. The non-linear converter circuit 131 executes the conversion of Equation (1) to output $x_j(=f(u_j))$. The output value $x_j$ is broadcast to the computation unit k in the output layer in the forward network through the input bus 141. The computation unit k in the output layer in the forward network sequentially inputs the output $x_j$ from the hidden layer in the forward network to weights it with the synapse weight therefor and cumulatively adds the product thus provided. When the control signal generating circuit 130 completes to address the computation units in the hidden layer in the forward network, each of the computation units in the output layer can compute Equation (2) to determine its output value $u_k$ (Operation 3).

The control signal generating circuit 130 generates onto the control signal line 142 the address of the computation unit k in the output layer in the forward network. The addressed computation unit k outputs its output value uk on the output bus 140. The non-linear conversion circuit 131 converts the output value $u_k$ into $x_k(=f(u_k))$ which is output to the input bus 141 through the selectors 125, 127 and 126. The output result can be read from the external output terminal 151. Then, if the output value $x_k$ from the output layer coincides with an expected value $t_k$, the learning is terminated. If not so, the following operations will be executed (Operation 4).

The control signal generating circuit 130 sets the output from the selector 125 for the side of the output bus 140, the output from the selector 127 for the side of the multiplier 160 and that from the selector 126 for the output from the selector 126. The circuit 130 generates onto control signal line 142 the address of the computation unit 1 in the input layer in the forward network. The output $x_i$ from the addressed computation unit i is sent to the multiplier 160 through the selector 125; the multiplier 160 multiply the output $x_{ik}$ by a constant $\eta$ to provide $\eta \cdot x_i$. The value $\eta \cdot x_i$ is output to the input bus 141 through the selectors 127 and 126. The computation unit i in the input layer in the backward network, when the corresponding $\eta \cdot x_i$ is output to the input bus, takes in the value. Subsequently, the control signal generating circuit 130 sets the output from the selector 125 for the side of the function conversion circuit 131 and that from the selector 127 for the side of the multiplier 160. The circuit 130 generates onto control signal line 142 the address of the computation unit j in the hidden layer in the forward network. The function converter circuit 131 converts the output $u_j$ from the addressed computation unit j into $x_j$ which is in turn sent to the multiplier 160 through the selector 125; the multiplier 160 multiply the output $x_i$ by a constant $\eta$ to provide $\eta \cdot x_i$ is output to the input bus 141 through the selectors 127 and 126. The computation unit j in the hidden layer in the backward network receives the corresponding $\eta \cdot x_i$. For example, the output value $u_j$ from the computation unit 120F is converted into $\eta \cdot x_j$ by the function converter circuit 131 and the multiplier 160; this value is output to the input bus 141. Then, the computation unit 120B takes in the value $\eta \cdot x_j$ (Operation 5).

The control signal generating circuit 130 sets the output from the selector 125 for the side of the function conversion circuit 132 and that from the selector 127 for the side of the selector 125. The circuit 130 generates onto control signal line 142 the addresses of the computation unit j in the hidden layer and the computation unit k in the forward network. The function converter circuit 132 converts the outputs $u_j$ and $u_k$ from the addressed computation units j and k into $x_j'$ and $x_k'$, respectively, which are in turn output to the input bus 141 through the selectors 125, 127 and 126. The computation units in the hidden layer and the output layer in the backward network can receive the corresponding $x_j$ and $x_k'$. For example, the output value $u_j$ from the computation unit 120F is converted into $x_j'$ by the function converter circuit 132; this value is output to the input bus 141. Then, the computation unit 120B takes in the value $x_j'$ (Operation 5).

A difference $(t_k - x_k)$ between an expected value $t_k$ and the above output value $x_k$ is set in each of the computation units in the output layer in the backward network from outside the backward network. This may be executed by a host computer or a circuit for computing $(t_k - x_k)$. Thus, the computation unit k in the output layer in the backward network computes $\delta_k$ expressed by Equation (4) (Operation 7).

The control signal generating circuit 130 sets the selectors 125 to 127 so that the output from the output bus 130 is multiplied by $\eta$ by the multiplier 160 and the value thus obtained is output to the output bus 140. The circuit 130 generates onto the control signal line 142 the address of the computation unit k in the output layer in the backward network. The output $\delta_k$ from the addressed computation unit is multiplied by $\eta$ by the multiplier 160; the value $\eta \cdot \delta_k$ thus obtained is output to the input bus 141. Then, the computation unit k in the output layer in the forward network, when the value $\eta \cdot \delta_k$ from the corresponding computation unit in the backward network is output to the input bus 141, takes in it (Operation 8).

The control signal generating circuit 130 sets the selectors 125 to 127 so that the value on the output bus 140 is output to the input bus 141 through the function converter circuit 131, and thereafter generates onto the control signal line 142 the address of the computation unit j in the hidden layer in the forward network. The addressed computation unit j outputs the internal energy $u_j$ previously computed. Thus, function-converted $x_j$ is output to the input bus 141. Each of the computation units in the output layer in the forward network computes the modification value $\Delta w_{kj}$ of the synapse weight $w_{kj}$ for the input value in accordance with Equation (3) to modify the synpase weight $w_{kj}$ (Operation 9).

The control signal generating circuit 130 sets the selectors 125 to 127 so that the value on the output bus 140 is output to the input bus 141 as it is, and thereafter generates onto the control signal line 142 the address of the computation unit k in the output layer in the backward network. The addressed computation unit k outputs the value $\delta_k$ previously computed. Thus, $\delta_k$ is output to the input bus 141 through the output bus 140, and the selectors 125, 127 and 126. Each of the computation units in the hidden layer in the backward network computes the modification value $\Delta w_{kj}$ of the synapse weight $w_{kj}$ for the input value $\delta_k$ in accordance with Equation (3) to modify the synapse weight $w_{kj}$ (Operation 10).

The control signal generating circuit 130 designates the address of the computation unit k in the output layer in the backward network. The addressed computation unit k outputs the value $\delta_k$ previously computed. Thus, $\delta_k$ is output to the input bus 141 through the output bus 140, and the selectors 125, 127 and 126. Each of the computation units in the hidden layer in the backward network computes $\delta_j$ in accordance with Equation (5) using the synapse weight $w_{kj}$ modified in the operation 10 (Operation 11).

The control signal generating circuit 130 sets the selectors 125 to 127 so that the output from the output bus 130 is multiplied by 0 by the multiplier 160 and the value thus obtained is output to the output bus 140. The circuit 130 generates onto the control signal line 142 the address of the computation unit j in the output layer in the backward network. The output $\delta_j$ from the addressed computation unit is multiplied by $\eta$ by the multiplier 160; the value $\eta \cdot \delta_j$ thus obtained is output to the input bus 141 through the selectors 127 and 126. Then, the computation unit j in the hidden layer in the forward network, when the value $\eta \cdot \delta_k$ from the corresponding computation unit in the backward network is output to the input bus 141, takes in it (Operation 12).

The control signal generating circuit 130 sets the selectors 125 to 127 so that the value on the output bus 140 is output to the input bus 141, and thereafter generates onto the control signal line 142 the address of the computation unit i in the input layer in the forward network. The addressed computation unit outputs $x_i$. Thus, $x_j$ is output to the input bus 141. Each of the computation units in the hidden layer in the forward network computes the modification value $\Delta w_{kj}$ of the synapse weight $w_{kj}$ for the input value $x_i$ in accordance with Equation (3) to modify the synapse weight $w_{kj}$ (Operation 13).

The control signal generating circuit 130 sets the selectors 125 to 127 so that the value on the output bus 140 is output to the input bus 141 as it is, and thereafter generates onto the control signal line 142 the address of the computation unit j in the hidden layer in the backward network. The addressed computation unit j outputs the value $\delta_j$ previously computed. Thus, $\delta_j$ is output to the input bus 141 through the output bus 140, and the selectors 125, 127 and 126. Each of the computation units in the input layer in the backward network computes the modification value $\Delta w_{ji}$ of the synapse weight $w_{ji}$ for the input value $\delta_j$ in accordance with Equation (3) to modify the synapse weight $w_{ji}$ (Operation 14).

Thereafter, the learning hitherto explained is repeated until the output value $x_k$ from the output layer for the input value $x_i$ reaches the expected value $t_k$.

In accordance with this embodiment, the computation of x and $\delta$ in each layer in both networks and the amount of data transfer is proportional to N so that the learning can be carried out at high speed for a time of 0 (N).

Now referring to FIGS. 7 and 8, detailed explanation will be made on the computation units constituting the forward network and the backward network.

Figure 7:
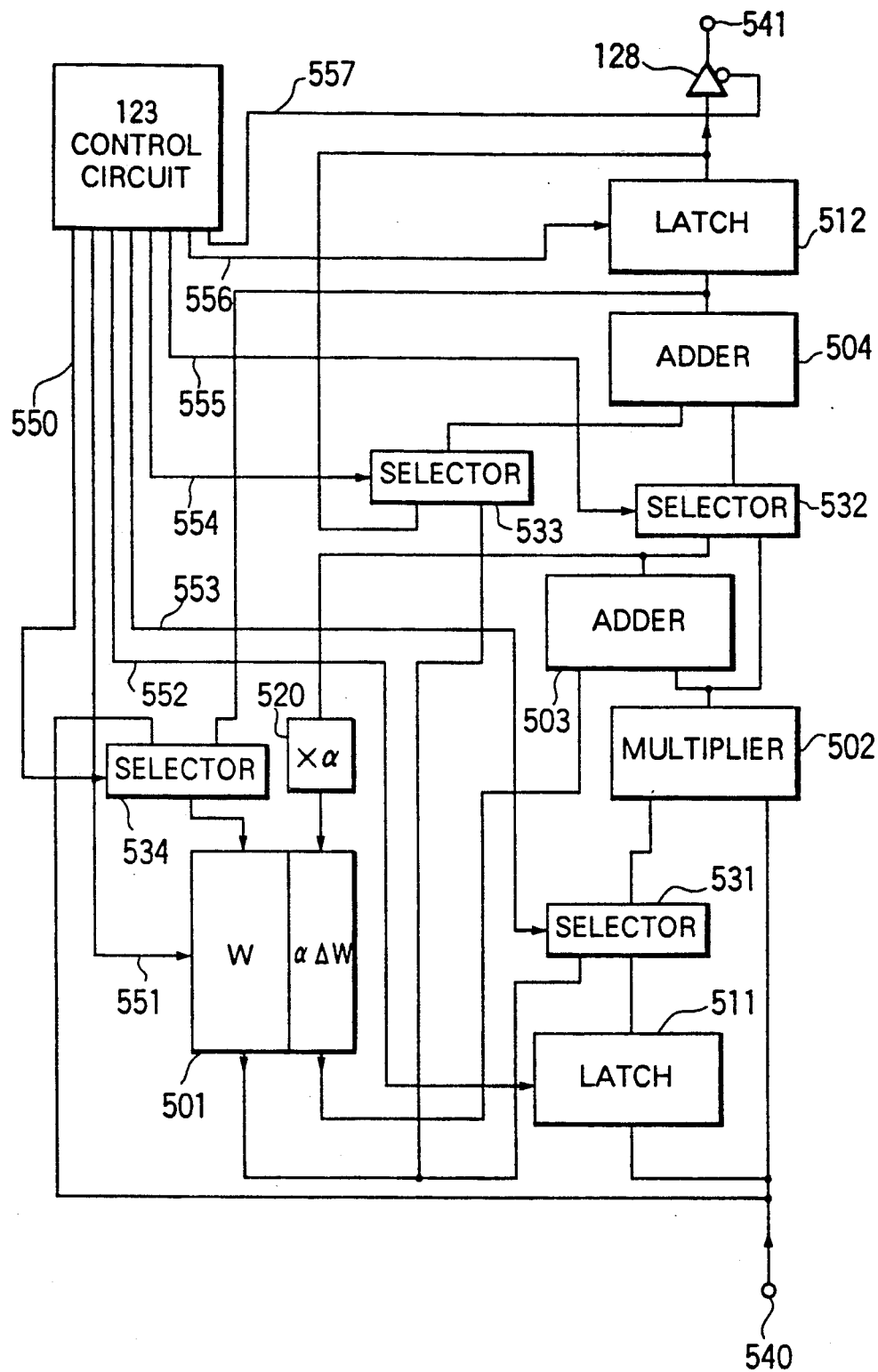
FIG. 7 is a block diagram showing an example of a computation unit (function block) according to the present invention constituting a forward network.

FIG. 7 shows one of the computation units constituting the forward network. In FIG. 7, 501 is memory for storing a synapse weight $w_{ji}$ and $\alpha \Delta w_{ji}^n$ in Equation (3). 503 and 504 are adders. 502 is a multiplier. 511 and 512 are latches. 520 is a multiplier for multiplying a previous modification value $\Delta w_{ji}^n$ by $\alpha$ in Equation (3). 531 to 534 are selectors. 540 is a terminal to be connected with the input bus 140 (FIG. 1). 550 to 557 are control signal lines of control signals generated by a control circuit 123; 550, 551, 552, 553, 554, 555, 556 and 557 serve to control the selector 534, the memory 501, the latch 511, the selector 531, the selector 533, the selector 532, the latch 512 and a buffer 128, respectively. 541 is a terminal to be connected with the output bus 140 (FIG. 1). Input/output relation for the respective components will be explained.

The latch 511 holds a signal input from the input bus connection terminal 540. The selector 531 receives the synapse weight $w_{ji}$ which is an output from the memory 501 and an output from the latch 511. The multiplier 502 receives an output from the selector 531 and the signal input from the input bus connection terminal 540. The adder 503 receives an output from the multiplier 502 and $\alpha \Delta w_{ji}^n$ which is an output from the memory 501. The selector 532 receives an output from the multiplier 502 and an output from the adder 503. The adder 504 receives an output from the selector 532 and an output form the selector 533. The latch 512 holds an output from the adder 504. The buffer 128 receives an output from the latch 512 and outputs it to the output bus connection terminal 541. The selector 533 receives an output from the latch 512 and the synapse weight $w_{ji}$ which is an output from the memory 501. The multiplier 520 receives an output from the adder 503. The selector 534 receives a signal input from the input bus connection terminal 540 and an output from the adder 504. The memory 501 receives, as write data, an output from the selector 534 on its synapse weight $w_{ji}$ side and an output form the multiplier 520 on its $\alpha \Delta w_{ji}^n$ side. The memory 501 also receives an address in accessing from the control circuit 123.

In writing an initial value of the synapse weight $w_{ji}$ in Operation 1, the initial value is supplied to the input bus connection terminal 540 and the output from the selector 531 is set for the side of the input bus connection terminal 540. Thus, the initial value can be stored in the memory 501.

The computation of Equation (2) is executed as follows. The output from the selector 531 is set for the side of the synapse weight $w_{ji}$ output of the memory 501. An input value $x_i$ is input from the input bus connection bus 540. A product $w_{ji} \cdot x_i$ is made by the multiplier 504. The selector 532 selects the side of the multiplier 502. The selector 533 selects the side of the latch 512. The adder 504 adds the output from the latch 512 which is a result of the cumulative addition made so far to the product $w_{ji} \cdot x_i$ and writes the addition result in the latch 512. If the above operation is repeated with different $w_{ji}$'s input from the input bus connection terminal 540, Equation (2) can be computed.

The value $\eta \cdot \delta_j$ to be input from the backward network is input from the input bus connection terminal to be stored in the latch 511.

The computation of Equation (3) is executed as follows. The output of the selector 531 is set for the side of the latch 511. An input value $x_i$ is input from the input bus connection bus 540. A product $\eta \delta_j \cdot x_i$ is made by the multiplier 502. The adder 503 adds the output $\alpha \Delta w_{ji}^n$ from the memory 501 and the output $\eta \delta_j x_i$ from the multiplier 502 to compute a modification value $\Delta w_{ji}^{n+1}$. The selector 532 selects the side of the adder 503. The selector 533 selects the side of the synapse weight $w_{ji}$ output from the memory 502. The adder 504 adds the previous synapse weight $w_{ji}^n$ output from the selector 533 and the modification value $\Delta w_{ji}^{n+1}$ output from the selector 532 to provide a modified synapse weight $w_{ji}^{n+1}$. The selector 534 selects the side of the adder 504. The multiplier 520 multiplies $\Delta w_{ji}^{n+1}$ output from the adder 503 by $\alpha$. The modified synapse weight $w_{ji}^{n+1}$ output from the selector 534 and $\alpha \Delta w_{ji}^{n+1}$ output from the multiplier 520 are stored in the memory 501. If the above operation is repeated with different input values $x_i$'s input form the input bus connection terminal 540, all the synapse weights $w_{ji}^{n+1}$'s can be modified.

Figure 8:
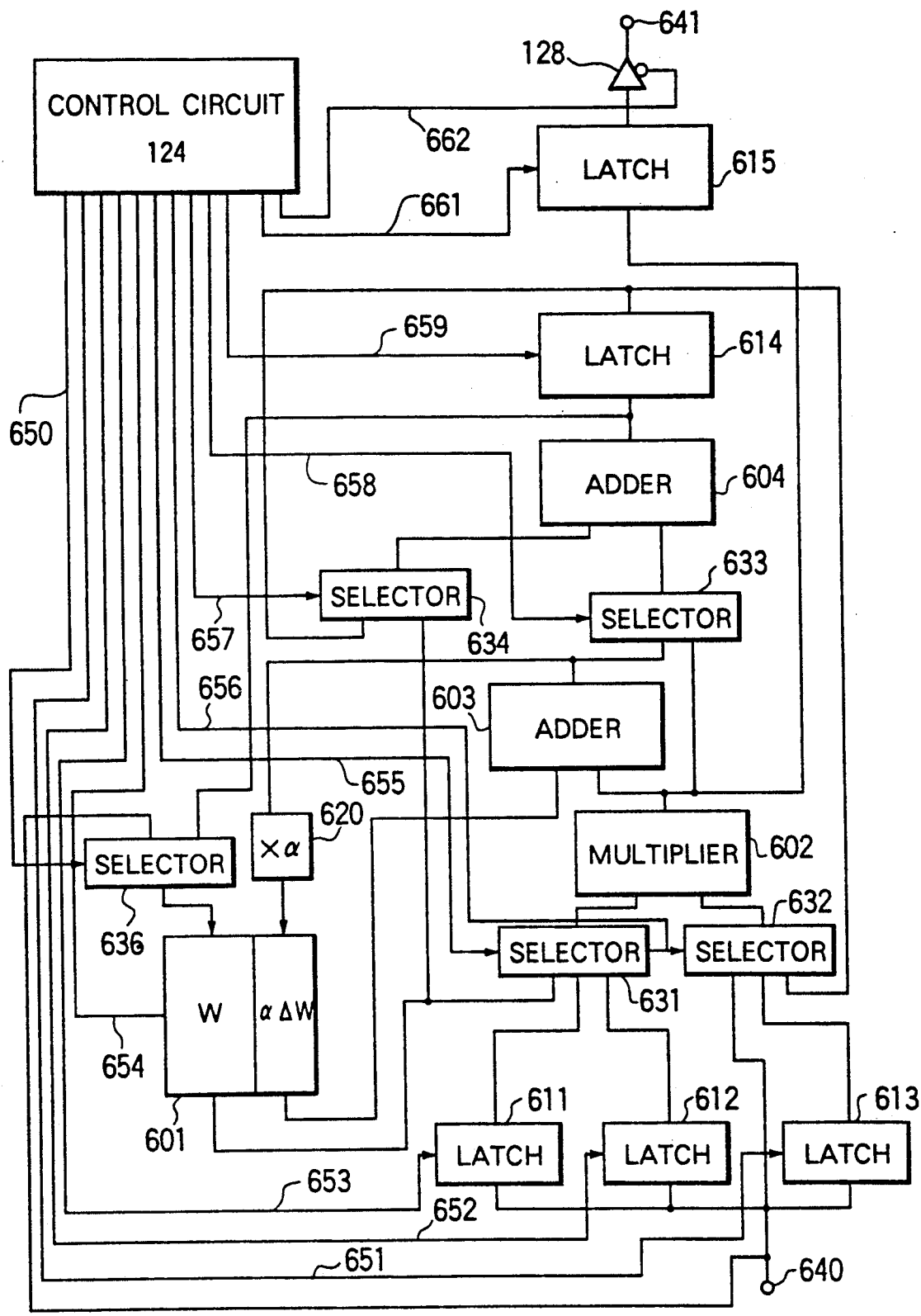
FIG. 8 is a block diagram showing an example of a computation unit (function block) according to the present invention constituting a backward network.

FIG. 8 shows one of the computation units constituting the backward network. In FIG. 8, 601 is memory for storing a synapse weight $w_{ji}$ and $\alpha \Delta w_{ji}^n$ in Equation (3). 603 and 604 are adders. 602 is a multiplier. 611 to 615 are latches. 620 is a multiplier for multiplying a previous modification value $\Delta w_{ji}^n$ by $\alpha$ in Equation (3). 631 to 634 and 636 are selectors. 640 is a terminal to be connected with the input bus 140 (FIG. 1). 650 to 659, 661 and 662 are control signal lines of control signals generated by a control circuit 124; they serve to control the selector 636, the latch 613, the latch 612, the latch 611, the memory 601, the selector 631, the selector 632, the selector 633, the latch 614 and a buffer 128, respectively. 641 is a terminal to be connected with the output bus 140 (FIG. 1). Input/output relation for the respective components will be explained.

The latches 611 to 613 holds a signal input from the input bus connection terminal 640. The selector 631 receives the synapse weight $w_{ji}$ output from the memory 501, an output from the latch 611 and an output from the latch 512. The selector 832 receives a signal input from the input bus connection terminal 540, an output from the latch 613 and an output from the latch 614. The multiplier 602 receives an output from the selector 631 and an output from the selector 632. The adder 603 receives an $\alpha \Delta w_{ji}^n$ output from the memory 501 and an output from the multiplier 602. The selector 633 receives an output from the adder 603 and an output from the multiplier 602. The adder 604 receives an output from the selector 634 and an output form the selector 633. The latch 612 receives an output from the adder 604. The selector 634 receives an output from the latch 614 and the synapse weight $w_{ji}$ output from the memory 501. The multiplier 620 receives an output from the adder 503. The multiplier 620 receives an output from the adder 603. The selector 636 receives a signal input from the input bus connection terminal 640 and an output from the adder 604. The memory 601 receives, as write data, an output from the selector 636 on its synapse weight $w_{ji}$ side and an output form the multiplier 620 on its $\alpha \Delta w_{ji}^n$ side. The memory 601 also receives an address in accessing from the control circuit 124. The latch 615 receives an output from the multiplier 602. The buffer 128 receives the output from the latch and outputs it to the output bus connection terminal 641.

In writing an initial value of the synapse weight $w_{ji}$, the initial value is supplied to the input bus connection terminal 640 and the output from the selector 636 is set for the side of the input bus connection terminal 640. Thus, the initial value can be stored in the memory 601.

The value $\eta x_j$ to be input from the backward network is input from the input bus connection terminal 640 to be stored in the latch 611. The value $x_j'$ $(=f'(uj))$ is also input from the input bus connection terminal 640 to be stored in the latch 612.

The difference $(t_k - x_k)$ between the output value $x_k$ necessary to operate the computation unit at issue as a computation unit in the output layer and an expected output value $t_k$ is input from the input bus connection terminal to be stored in the latch 613. The computation unit in the output layer executes the following operation to compute $\delta_k$.

The selector 631 selects the side of the latch 612, and the selector 632 selects the side of the latch 813. The multiplier 602 multiplies the output value $x_k'(=f'(uk))$ from the latch 612 by the output value $(t_k - x_k)$ from the latch 613 to provide $\delta_k$ expressed by Equation (4). The latch 615 takes in the output $\delta_k$ from the multiplier 602 and outputs it to the buffer 128. This value $\delta_k$ is output at the output bus connection terminal 641.

The computation unit in the output layer executes the following operation to compute $\delta_j$ in Equation (5).

The output from the selector 631 is set for the side of the synapse weight $w_{ji}$ output of the memory 601. An input value $x_i$ is input from the input bus connection bus 640. The selector 632 selects the side of the input bus connection terminal 640. The output $\delta_k$ from the output layer is input to the input bus connection terminal 640. The product $\delta_k w_{jk}$ is made by the multiplier 602. The selector 634 selects the side of the latch 614. The adder 604 adds the output from the latch 614 which is a result of the cumulative addition made so far to the product $\delta_k w_{kj}$ and writes the addition result in the latch 614. If the above operation is repeated with different $\delta_k$'s input from the input bus connection terminal 640, $\Sigma \delta_k w_{kj}$ expressed by Equation (2) can be computed. Next, the selector selects the side of the latch 612, and the selector 632 selects the side of the latch 614. The multiplier 602 multiplies the output $x_j'(=f'(u_j))$ from the latch 612 by the output $\Sigma \delta_k w_{kj}$ from the latch 614 to provide $\delta_j$. The latch 615 takes in the output $\delta_j$ from the multiplier 602 and sends it to the buffer 128. Thus, $\delta_j$ is output at the output bus connection terminal 641.

The computation of Equation (3) is executed in the hidden layer in the backward network as follows. The output of the selector 631 is set for the side of the latch 611. An input value $\delta_k$ is input from the input bus connection bus 640. A product $\eta x_j \delta_j$ is made by the multiplier 602. The adder 603 adds the output $\alpha \Delta w_{kj}^n$ from the memory 601 and the output $\eta x_j \delta_k$ from the multiplier 602 to compute a modification value $\Delta w_{kj}^{n+1}$. The selector 633 selects the side of the synapse weight $w_{ji}$ output from the memory 602. The selector 634 selects the side of the synapse weight $w_{kj}$ output from the memory 601. The adder 604 adds the previous synapse weight $w_{kj}^n$ output from the selector 634 and the modification value $\Delta w_{kj}^{n+1}$ output from the selector 633 to provide a modified synapse weight $w_{kj}^{n+1}$. The selector 636 selects the side of the adder 604. The multiplier 620 multiplies $\Delta w_{kj}^{n+1}$ output from the adder 603 by $\alpha$. The modified synapse weight $w_{kj}^{n+1}$ output from the selector 636 and $\alpha \Delta w_{kj}^{n+1}$ output from the multiplier 620 are stored in the memory 601. If the above operation is repeated with different input values $\delta_k$'s input form the input bus connection terminal 640, all the synapse weights $w_{kj}^{n+1}$'s can be modified. Also in the input layer in the backward network, the synapse weight's can be modified.

As understood from the above description, the computation unit in the output layer in the forward network and that in hidden layer in the backward network holds the same synapse weight $w_{kj}^n$; this synapse weight is modified individually by the corresponding computation unit to provide the same modified value $w_{kj}^{n+1}$. Likewise, the computation unit in the output layer in the forward network and that in hidden layer in the backward network holds the same synapse weight $w_{ji}^n$; this synapse weight is modified individually by the corresponding computation unit to provide the same modified value $w_{ji}^{n+1}$.

Figure 9:
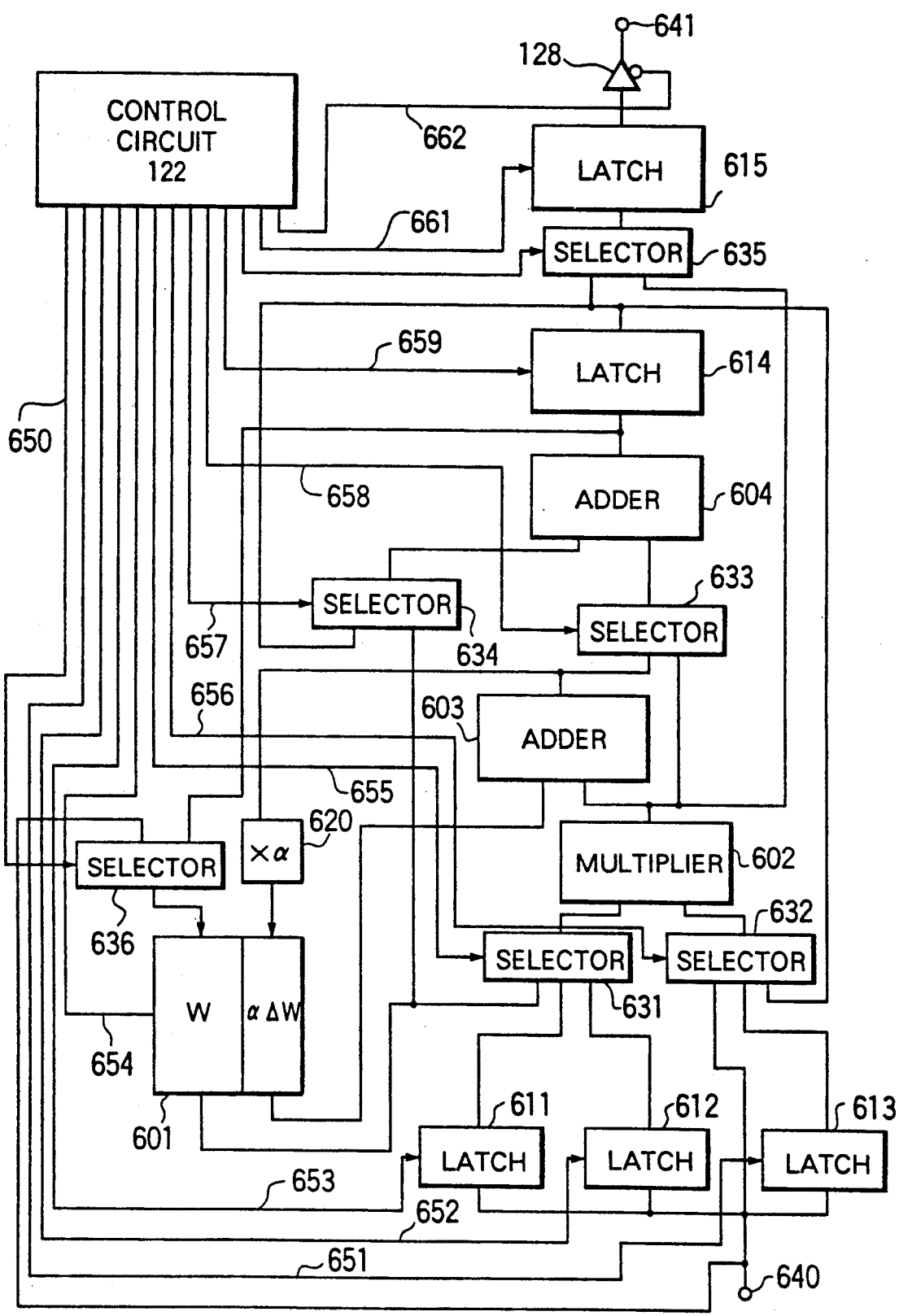
FIG. 9 is a block diagram of the computation unit of FIG. 8 provided with a selector 635 and a control line 660.

FIG. 9 shows a modification of the computation unit shown in FIG. 8 which is further provided with a selector 635 and a control line 660 for controlling it. In FIG. 9, 122 is a control circuit. The selector 635 receives an output from the latch 614 and an output from the multiplier 602. The latch 615 receives an output form the selector 635. The other components operate in the same way as in FIG. 8. If the output from the selector 635 is set for the side of the multiplier 602, the computation unit can operate in the same way as that shown in FIG. 8 and so can be adopted as a computation unit for the backward network. Further, if the output from the selector 635 is set for the side of the latch 614, and the latch 511, the selector 531, the multiplier 502, the adder 503, the selector 532, the adder 504, the latch 512, the selector 533, the multiplier 520, the selector 534 and the memory 501 in FIG. 7 are taken as corresponding to the latch 611, the selector 631, the multiplier 602, the adder 603, the selector 633, the adder 604, the latch 614, the selector 634, the multiplier 620, the selector 636 and the memory 601 in FIG. 9, respectively, the computation unit of FIG. 9 can be adopted as a computation unit for the forward network. Therefore, it is not necessary to design two kinds of computation units as shown in FIGS. 7 and 8 in order to implement this embodiment but only necessary to design the computation unit as shown in FIG. 9, thereby extremely reducing the design man-power.

In this way, the present invention can be implemented on an integrated circuit so that the neural network for high speed learning can be realized.

Figure 2A:
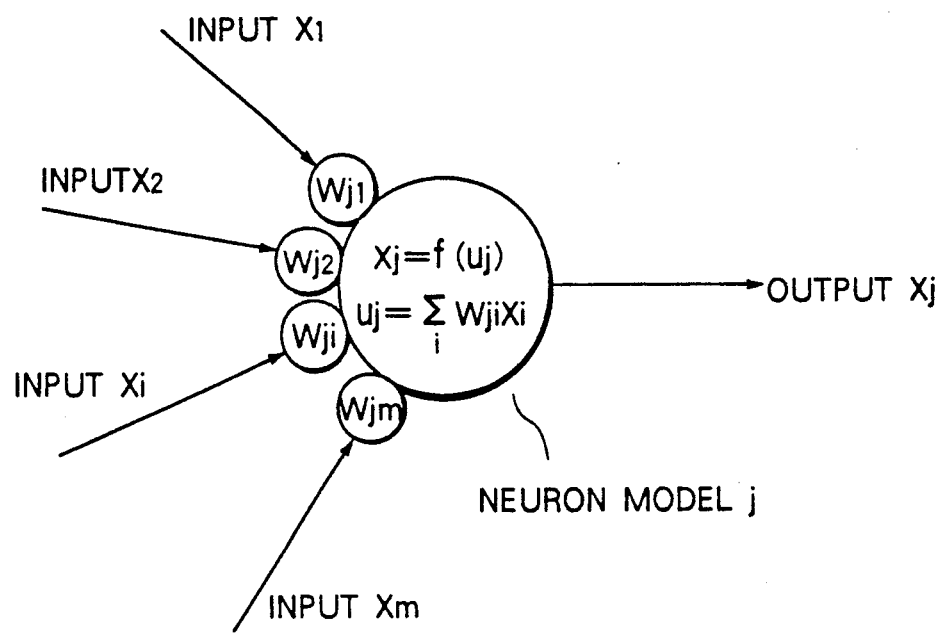
FIGS. 2A and 2B are views showing a model of a neuron, a plurality of which constitutes a neural network.
Figure 2B:
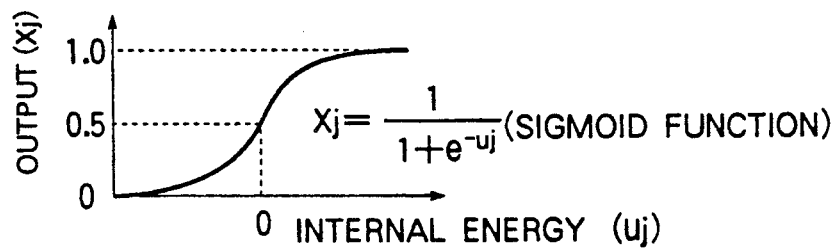
Figure 3:
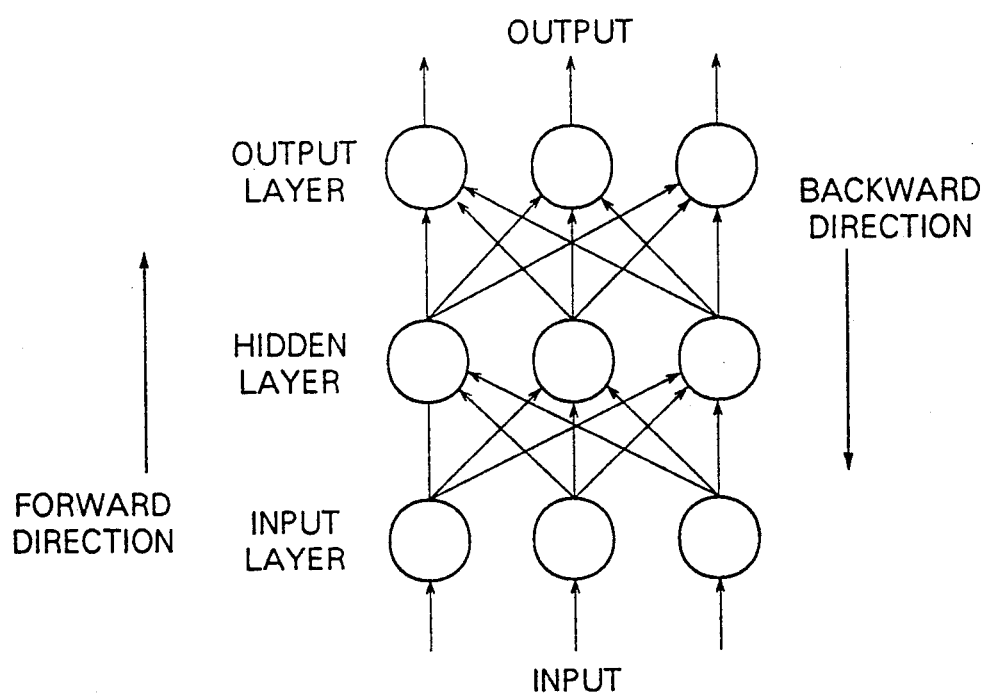
FIG. 3 is a view showing a hierarchical neural network.
Figure 4:
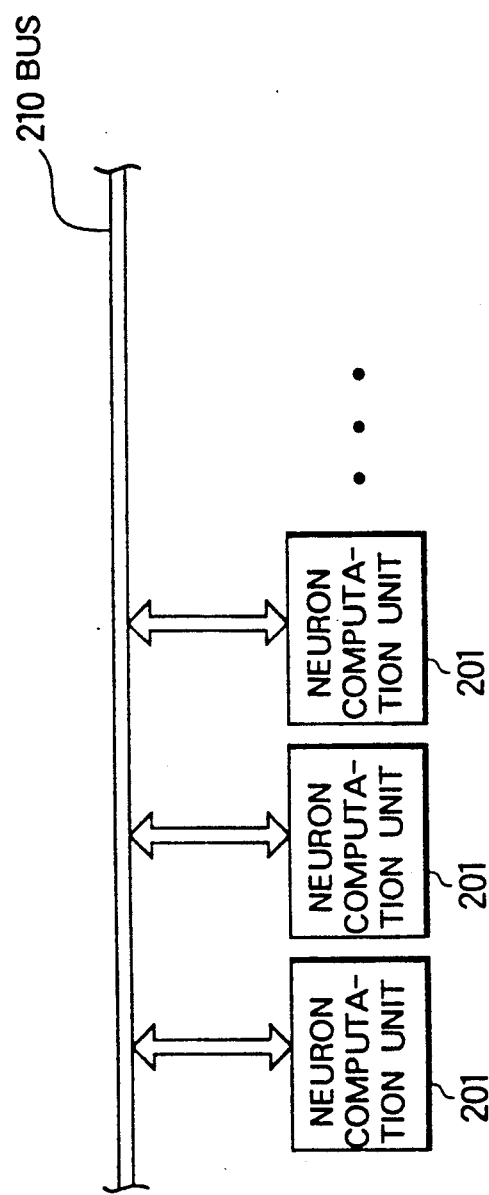
FIG. 4 is a view showing dedicated hardware for simulating the neural network at high speed.
Figure 10:
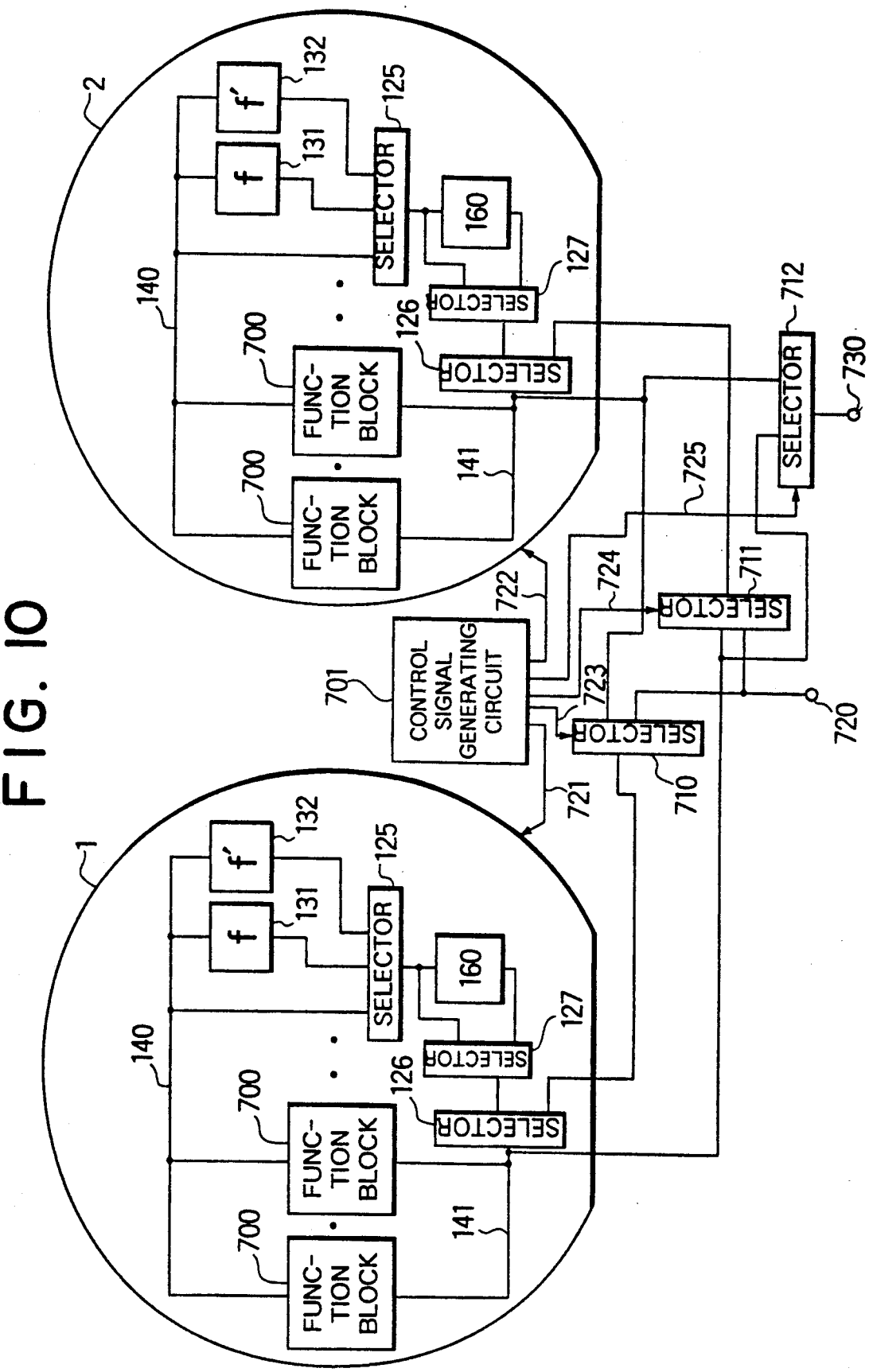
FIG. 10 is a block diagram showing another embodiment of the present invention.

Now referring to FIG. 10, another embodiment of the present invention will be explained. In FIG. 10, and 2 are wafers. 700's are function blocks each of which can be constructed as shown in FIG. 9. 710 to 712 are selectors. 701 is a control signal generating circuit which has the function of the control signal generating circuit 130 of FIG. 1 and also has a function of controlling the selectors 710 to 712. 720 is an input terminal and 730 is an output terminal. 721 to 725 are control signal lines. The respective networks within the wafers 1 and 2 correspond to FIG. 1. The selector 711, in response to inputs from the external output terminal 151 of the wafer 1 as shown in FIG. 1 and the input terminal 720, produces an output to the external input terminal 150 of the wafer 2 as shown in FIG. 1. The selector 710, in response to inputs from the input terminal 720 and the external output terminal 151 of the wafer 2 as shown in FIG. 1, produces an output to the external input terminal 151 of the wafer as shown in FIG. 1. The selector 712, in response to inputs from the external output terminal 151 and the external output terminal 151 of the wafer 2, produces an output to the external output terminal 730. The control signal generating circuit 701 supplies control signals to the selectors 710 to 712 through the control signal lines 723 to 725, and also serves to control the wafers 1 and 2 through the control lines 721 and 722. The signal on the input bus 141 of the wafer 1 can be sent to that of the wafer 2 through the selector 711, whereas the signal of the input bus 141 of the wafer 2 can be sent to that of the wafer 1 through the selector 710. Further, the signal input from the external input terminal 720 can be sent to the respective input buses 141 of the wafers 1 and 2.

In this way, connection can be easily made between two wafers so that a very large scale neural network can be learned at high speed.

Further, if the forward network and the backward network are constructed by the wafers 1 and 2, respectively, the modification value for the synapse weight expressed by Equation (3) can be simultaneously obtained in both networks; this allows further high speed learning.

Although connection between two wafers is shown in FIG. 10, connection among three or more wafers can be easily made with slight modification in design.

Further, the arrangement of FIG. 1 may be provided as it is on a wafer, and each of the networks may be provided on plural wafers.

Figure 11:
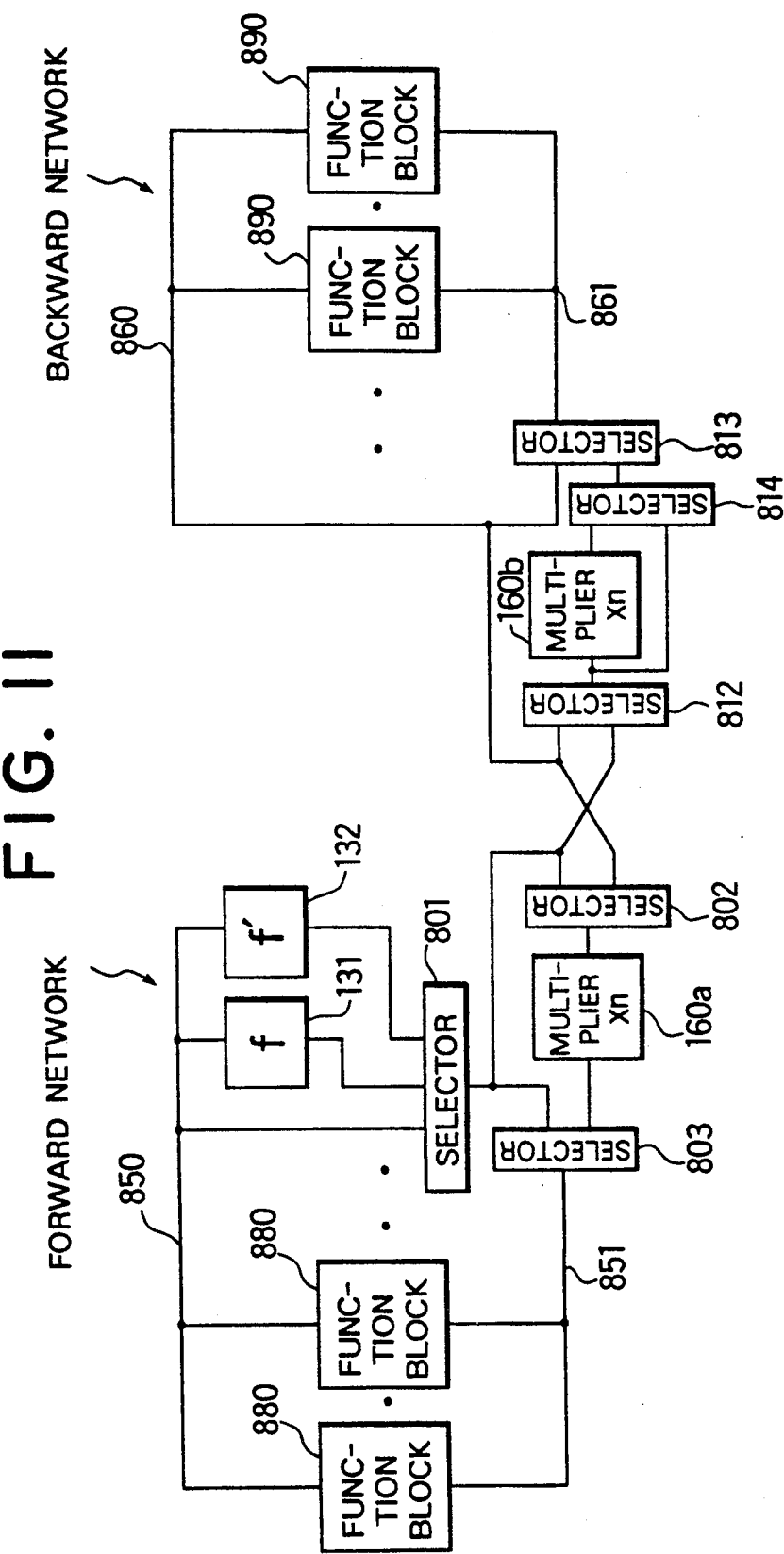
FIG. 11 is a block diagram showing still another embodiment.

Referring to FIG. 11, still another embodiment of the present invention will be explained. In FIG. 11, 880 and 890 are function blocks, and 801 to 803 and 812 to 814 are selectors. The function block 880 can be constructed as shown in FIG. 7 whereas the function block 890 can be constructed as shown in FIG. 8. These function blocks may be also constructed as shown in FIG. 9. 850 and 860 are output buses, and 851 and 861 are input buses. 160a and 160b are multipliers. The network on the left corresponds to the forward network and that on the right corresponds to the backward network. Although the control signal generating circuit and the control signal lines are not shown in FIG. 11, they are arranged in the same manner as in FIGS. 1 and 10 so that each of the function blocks and each of the selectors can be controlled.

In the forward network, each of the function blocks 880 produces an output to the output bus 850. The function conversion circuits 131 and 132 function-convert an input from the output bus 1. The selector 801 selects one of an output from the output bus 850 and outputs from the function converter circuits 131 and 132. The selector 802 receives the output from the selector 801 and the output on the output bus 860 in the backward network. The multiplier 160a multiplies the output from the selector 802 by a constant 0. The selector 803 selects one of the output from the selector 801 and the output from the multiplier 160 and outputs it to the input bus 851. Each of the function blocks 880 can receive the value output to the input bus 851. On the other hand, in the backward network, the output from each of the function blocks 890 is generated on the output bus 860. The selector 812 selects one of the output on the output bus 860 and the output from the selector 801. The multiplier 160b multiplies the output from the multiplier 160b by the constant $\eta$. The selector 814 selects one of the output from the selector 812 and the output from the multiplier 160b. The selector 813 selects one of the outputs from the output bus 860 and the selector 814 and sends it to the input bus 861.

In the arrangement of FIG. 11, each of the function blocks 880 constituting the forward network can take in the value on the output bus 860 in the backward network multiplied by $\eta$ by the multiplier 160a. Likewise, the function blocks 890 constituting the backward network can take in the value on the output bus 850 in the forward network multiplied by $\eta$ by the multiplier 160b. Therefore, the operation of transferring $\eta_j$ from the forward network to the backward network in Operation 5 in FIG. 6 can be executed in Operation 3. Specifically, when each of the function blocks broadcasts its output $x_j$ to the other function blocks, it can multiplies $x_j$ by $\eta$ by the multiplier 160b and sends the product $x_j \cdot \eta$ thus obtained to the input bus 861 of the backward network. Likewise, the operation of transferring $\eta \delta$ from the backward network to the forward network in Operation 8 and 12 can be executed in Operations 7 and 11. In this way, by stealing the output to be transferred to the input bus of the other network, the time required for Operations 5, 8 and 12 in FIG. 6 can be omitted; this will allow even higher speed learning.

Now referring to FIGS. 12 to 26, explanation will be made on the neuro-computing system according to the present invention. First, its arrangement will be generally explained with reference to FIGS. 12 to 19, and thereafter its operation and the control required therefor will be explained with reference to FIGS. 20 to 27.

Figure 12:
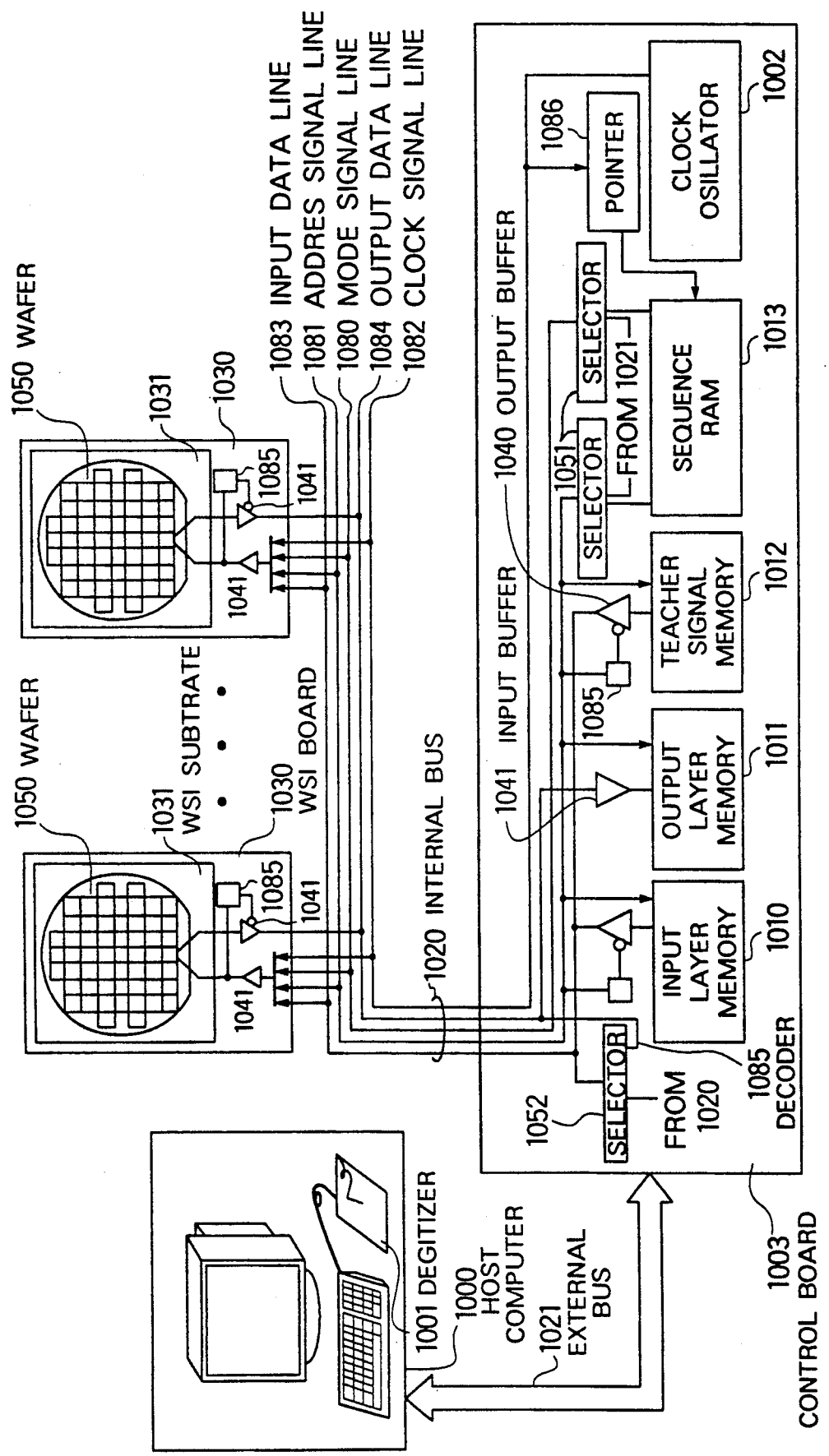
FIG. 12 is a block diagram showing the entire arrangement of a neuro-computing system according to the present invention.

FIG. 12 shows the entire arrangement of the system. In FIG. 12, 1000 is a host computer and 1001 is a digitizer which is one of input devices to the host computer 1000. 1003 is a control board. 1030's are WSI (wafer scale integrated circuit) boards, 1031's WSI substrates, and 1050's are wafers. each of the wafers 1050 is kept in contact with each of the WSI substrates 1031 which is connected with each of the WSI boards. This enables power supply and signal input/output for the wafer 1050 to be made. 1080 is a mode signal line, 1081 is an address signal line, 1082 is a clock signal line and 1083 is an input data lie and 1084 is an output data line. The control board 1003 is connected with each of the WSI boards 1030 through an internal bus 1020 for the lines 1080 to 1084. Located on the control board 1003 are an input layer memory 1010, an output memory 1011, a teacher signal memory 1012, a sequence memory 1013, and a clock oscillator 1002, 1021 is an external bus through which the host computer 1000 can access each of the memories 1010 to 1013 to optionally execute read/write therefor. Further located on the control board 1003 are decoders 1085, output buffers 1040 and an input buffer 1041. The input layer memory 1010 and the teacher signal memory 1012 can input the address signal line 1081 and send their contents to the input data line 1083 to the corresponding output buffer 1040 which is controlled by the decoder 1085. The decoder 1085 inputs the mode signal line 1080 and the address signal line 1081 to decode them. The sequence RAM 1013 serves to generate a mode signal and an address signal. 1086 is a pointer which receives clocks from the clock oscillator 1002 through the clock signal line 1082 and increase an output one by one. The pointer 1086 repeats this operation to designate the addresses of the instructions stored in the sequence RAM 1013; the instructions for the mode signal and the address signal to be executed are sequentially stored previously at the individual addresses of the sequence RAM 1013. 1051's are selectors each of which serves to send the instruction output from the sequence RAM 1013 or the external bus 1021 to the mode signal line 1080 and the address signal line 1081, 1052 is also a selector which serves to send the value output from the output data line 1084 and the external bus 1021 to the input data line 1083.

The teacher signal memory 1012 previously stores teacher signals for the output layer. The input layer memory 1010 serves as input layer neurons and previously stores the values of the input layer neurons. The output layer memory 1011 inputs the output data line 1084 and the address signal line 1081 through the input buffer 1041 to take in the outputs from the output layer neurons.

The WSI board 1030 serves to connect the mode signal line 1080, the address signal line 1081, the clock signal line 1082 and the input data line 1083 with the wafer 1050 through the input buffer 1040, and send he signal output from the wafer 1050 to the output data line 1084 through the output buffer 1040 controlled by the decoder 1085. The decoder 1085 inputs the mode signal line 1080 and the address signal line 1081. When the corresponding board address is designated, the host computer 1000 can store signals in the latch, memory, etc. in the wafer 1050.

Figure 13:
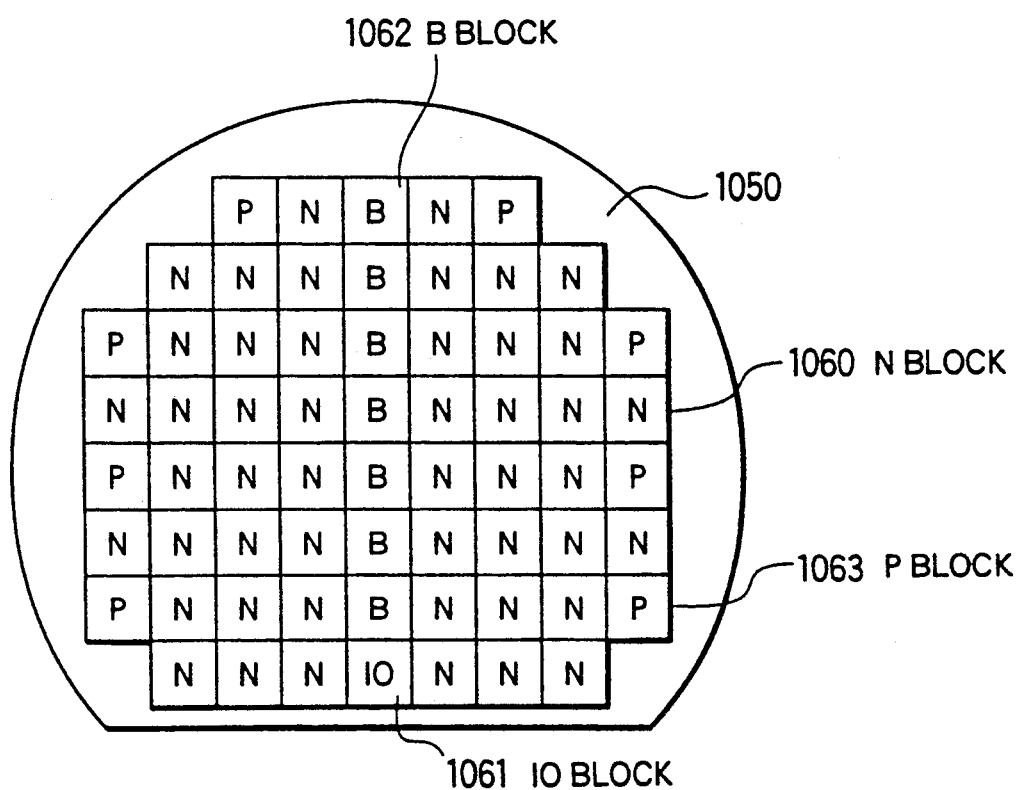
FIG. 13 is a view showing the arrangement of a wafer in the neuro-computing system according to the present invention.

FIG. 13 shows the construction of the wafer 1050. As seen from FIG. 13, the wafer 1050 is composed of N blocks 1060, an IO block 1061, B blocks 1062 and P blocks 1063. The respective blocks are arranged at regular intervals in vertical (column) and horizontal (row) directions. The I/O block 1061 is located at the bottom of a central column, and seven B blocks are located on the remaining central column; the IO block serves to execute signal input/output from/to the outside. The N blocks 1060 are located on the columns other than the central column and the P blocks are located in the periphery of the wafer; the P blocks serve to control the quality in the semiconductor process for the wafer. The N block 1060 incorporates neuron blocks and the B block 1062 incorporates a function conversion table. The IO block 1061 has a function of executing input/output from/to the outside as well as the function of the B block. The details of the IO block, the B blocks and the N blocks will be described later with reference to FIGS. 16 and 17.

Figure 14:
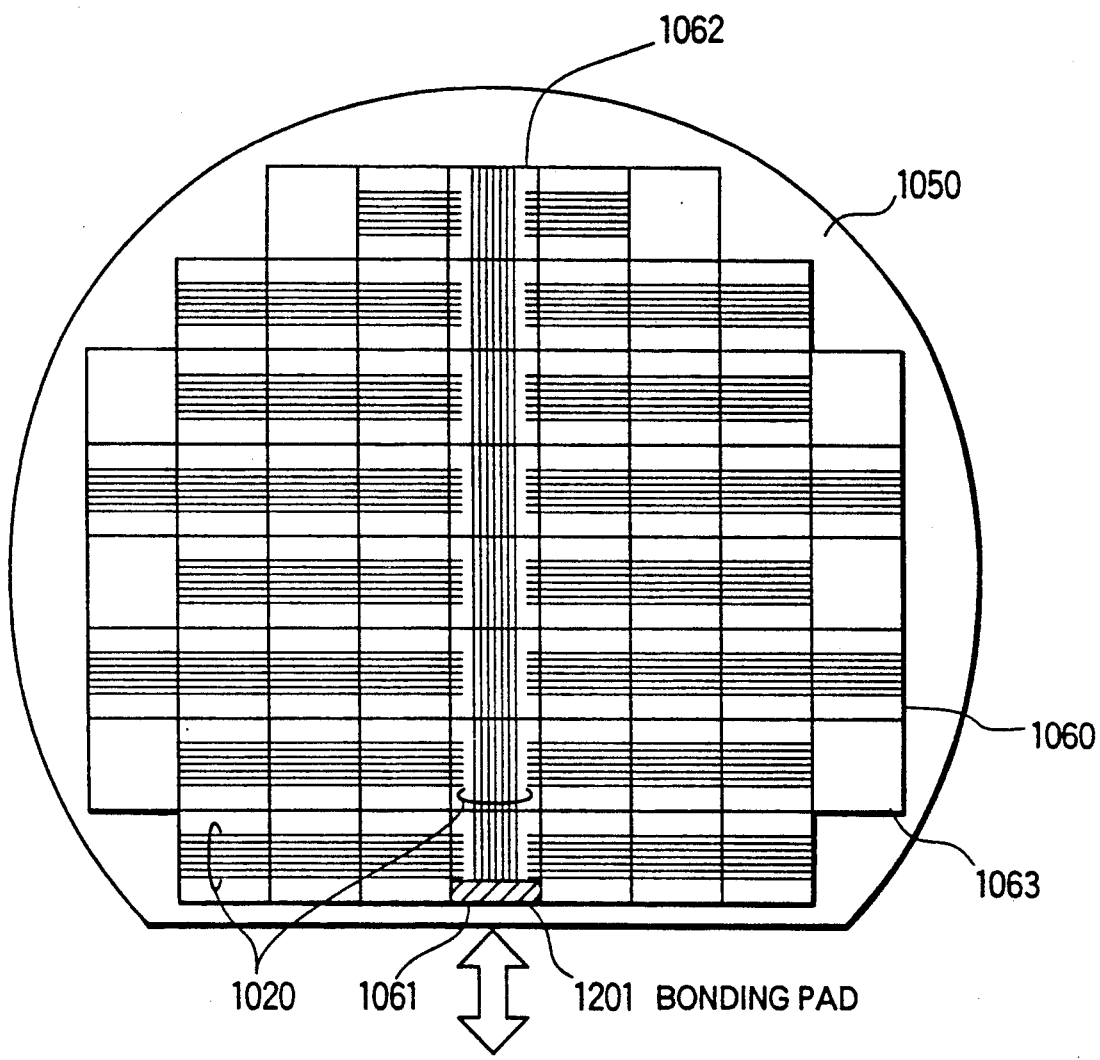
FIG. 14 is a view showing the location of signal lines on a wafer.

FIG. 14 shows the construction and arrangement of signal lines within the wafer 1050. In FIG. 14, 1201 is a bonding pad located at the bottom of the IO block 1061; this bonding pad connects the signal lines with the outside through bonding wires. A signal is sent to each of the N blocks in such a way that it flows through the IO block 1061 and each of the B blocks in the vertical direction and thereafter in the horizontal direction. The outputs from the neuron blocks in the N block are collected to the B block or IO block on the corresponding row and function-converted there. The value thus obtained is sent to the outside through the IO block for input/output.

Figure 15:
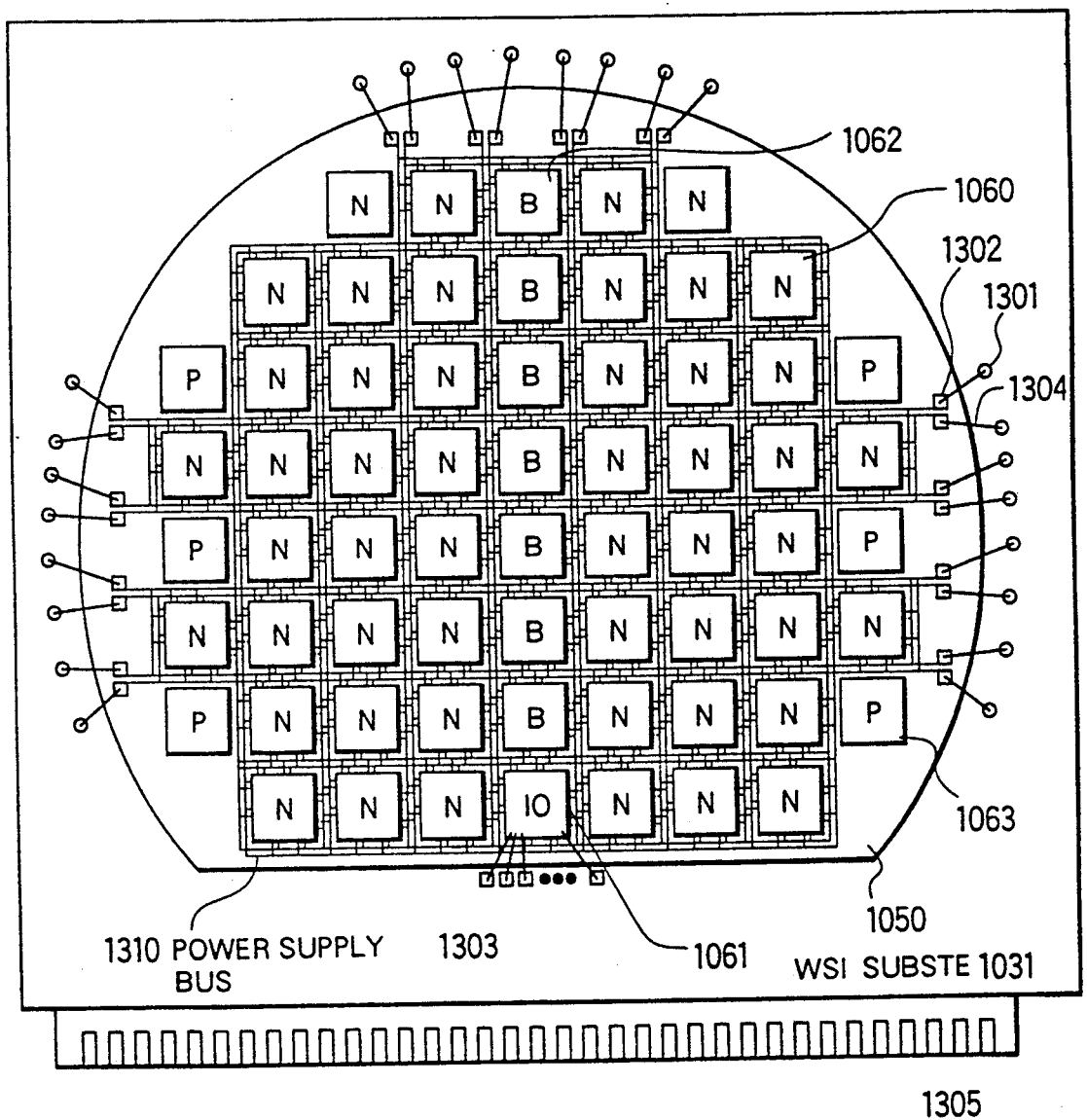
FIG. 15 is a view showing a method of supplying power to respective blocks of the wafer and an arrangement of a WSI substrate.

FIG. 15 shows the manner of supplying power to each of the blocks on the wafer 1050 and the construction of the WSI substrate 1031. In FIG. 15, 1301 and 1303 are bonding pads, 1304's are bonding wires, and 1305 is a connector. 1310 is a power supply bus for supplying power to the respective blocks. The connector 1305, which is connected with the WSI board 1030, connects the power supply lines and the signal lines with the WSI substrate 1031. The power supply lines are drawn from the bonding pads 1301 to the connector 1305 through the interior of the WSI substrate 1031. The signal lines are drawn from the bonding pads 1303 to the connector 1305. Power supply buses 1310 are arranged in a matrix shape among the blocks 1060 to 1062; these blocks are connected with the power supply buses 1310, and bonding pads 1302 are provided at the terminals of the power supply buses. The bonding pads 1302 on the wafer 1050 are connected with the bonding pads 1301 through the bonding wires 1304, respectively so that power can be supplied to the respective blocks 1060 to 1062. Further, the bonding pad 1201 (FIG. 14) on the wafer 1050 is connected with the bonding pad 1303 on the WSI substrate 1031 through the bonding wires 1304 so that the internal bus 1020 (FIG. 12) can be connected with the IO block 1061.

Figure 16:
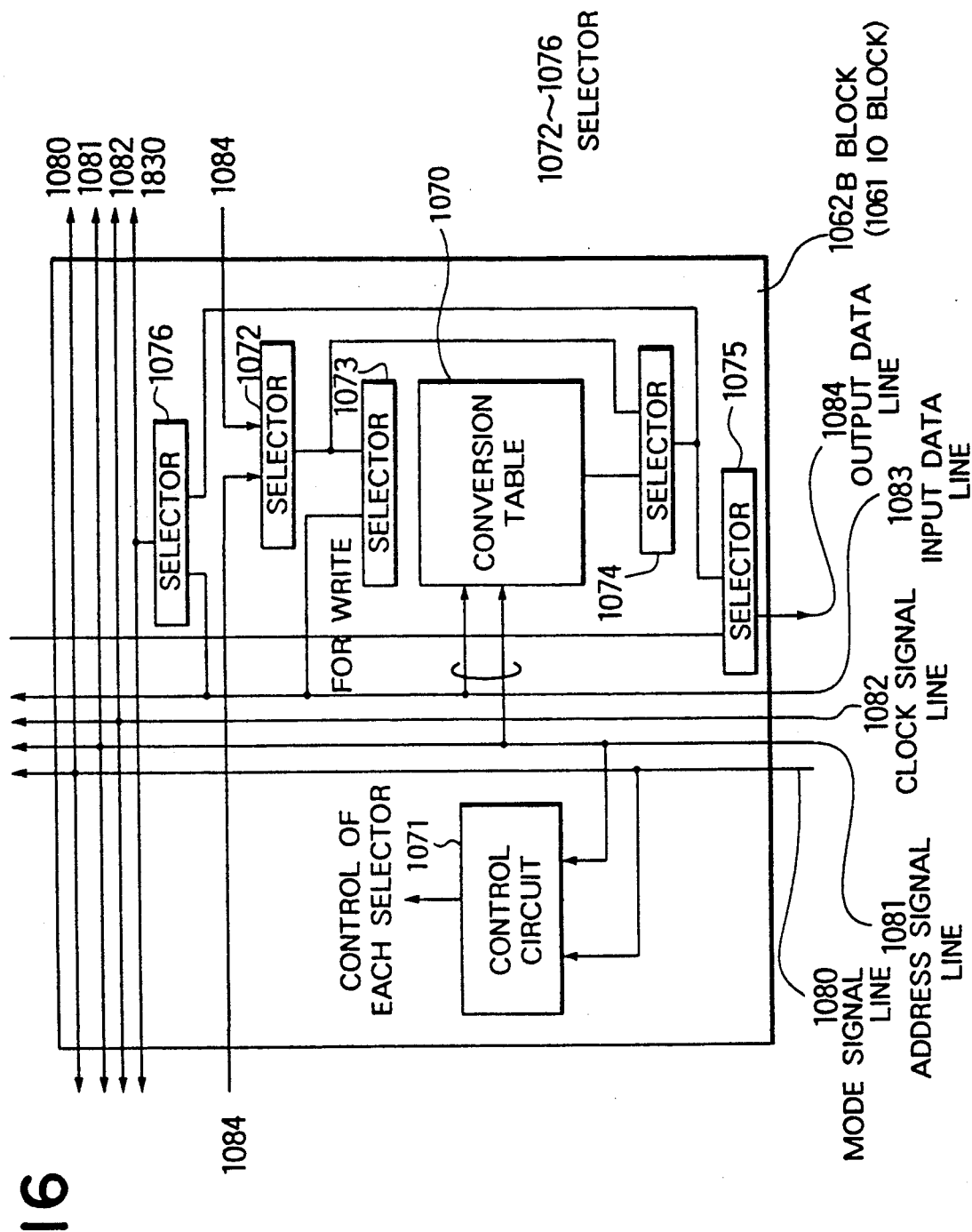
FIG. 16 is a view showing a B block (IO block)

FIG. 16 shows the details of the B block. It should be noted that the IO block 1061 has the function of input/output in/from the outside as well as the function of the B block. In FIG. 16, 1070 is a conversion table, 1071 is a control circuit, and 1072 to 1076 are selectors. The B block 1062 (IO block 1061) inputs the mode signal line 1080, the address signal line 1081, and the clock signal line 1082 from the outside, the IO block 101 or the B block 1062 connected with the its lower side to provide outputs to the N blocks 1060 connected with its upper side and right and left sides. The input data line 1083 has a path incoming from the lower side and outgoing to the left and right sides through the selector 1073, the conversion table 1070, the selector 1074 and the selector 1074. The path may outgo to the left and right sides not through the conversion table but only through the selector 1076. The output data liens 1084 incoming from the N blocks 1060 connected with the left and right sides have a path outgoing to the B block 1062, the IO block connected with the lower side or the outside through the selector 1072, the selector 1073, the conversion table 1070, the selector 1074 and the selector 1075. The output data liens 1084 incoming the left and right sides may have a path outgoing to the lower side through the selectors 1072 and 1075. The selectors 1072 to 1076 are controlled by the control circuit 1071 which generates, in response to inputs rom the mode signal line 1080 and the address signal line 1081, the control signals for the respective selectors 1072 to 1076. The details of the construction of the control 1081 will be described later with reference to FIG. 21. It should be noted that the conversion table 1070 is connected with the address signal line 1081 and the input data line 1083 for write.

Figure 17:
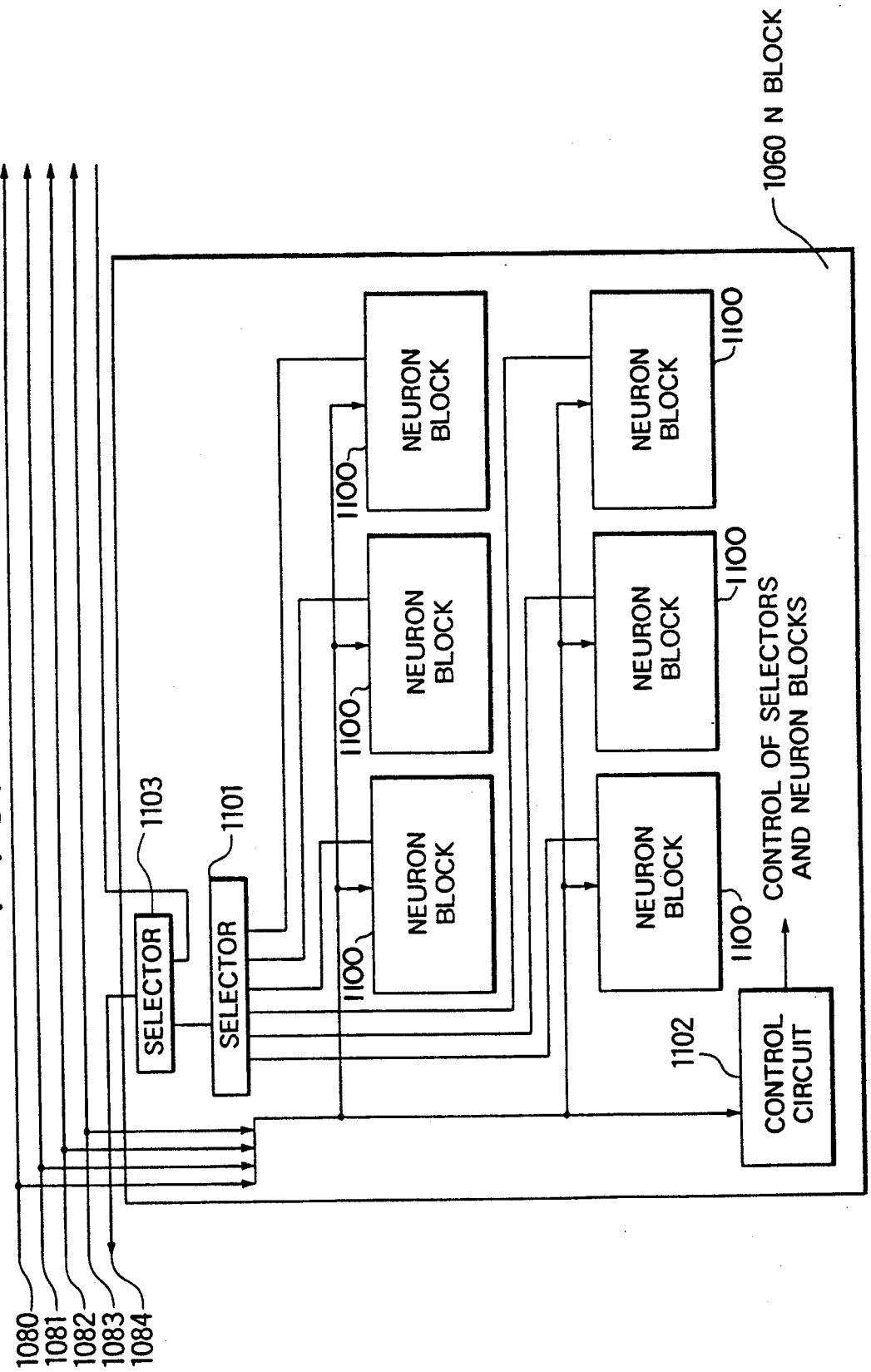
FIG. 17 is a view showing an N block.

FIG. 17 shows the details of the N block. The N block shown in FIG. 17 is the block located on the right side with respect to the center line on the wafer 1050. The N block located on the left side is symmetric in the horizontal direction. In FIG. 17, 1100's are neuron blocks; 1101 and 1103 are selectors; and 1102 is a control circuit. Each of the N blocks incorporates six neuron blocks 1100. Each of the neuron blocks 1100 is connected with the mode signal line 1080, the mode signal line 1081, the clock signal line 1082 and the input data line 1083. The control circuit 1102 serves to decode the address signal line 1081 and select one of the outputs from the neuron blocks 1100 in the N block 1060 to be output to the selector 1103. Another input to the selector 1103 is the output data line 1084 from the n block 1060 connected with the right side of the N block at issue. The output from the selector 1103 is connected with the N block connected with the left side, the B block 1062 or the IO block 1061. It should be noted that the selector 1103 is controlled by the control circuit 1102.

Figure 18:
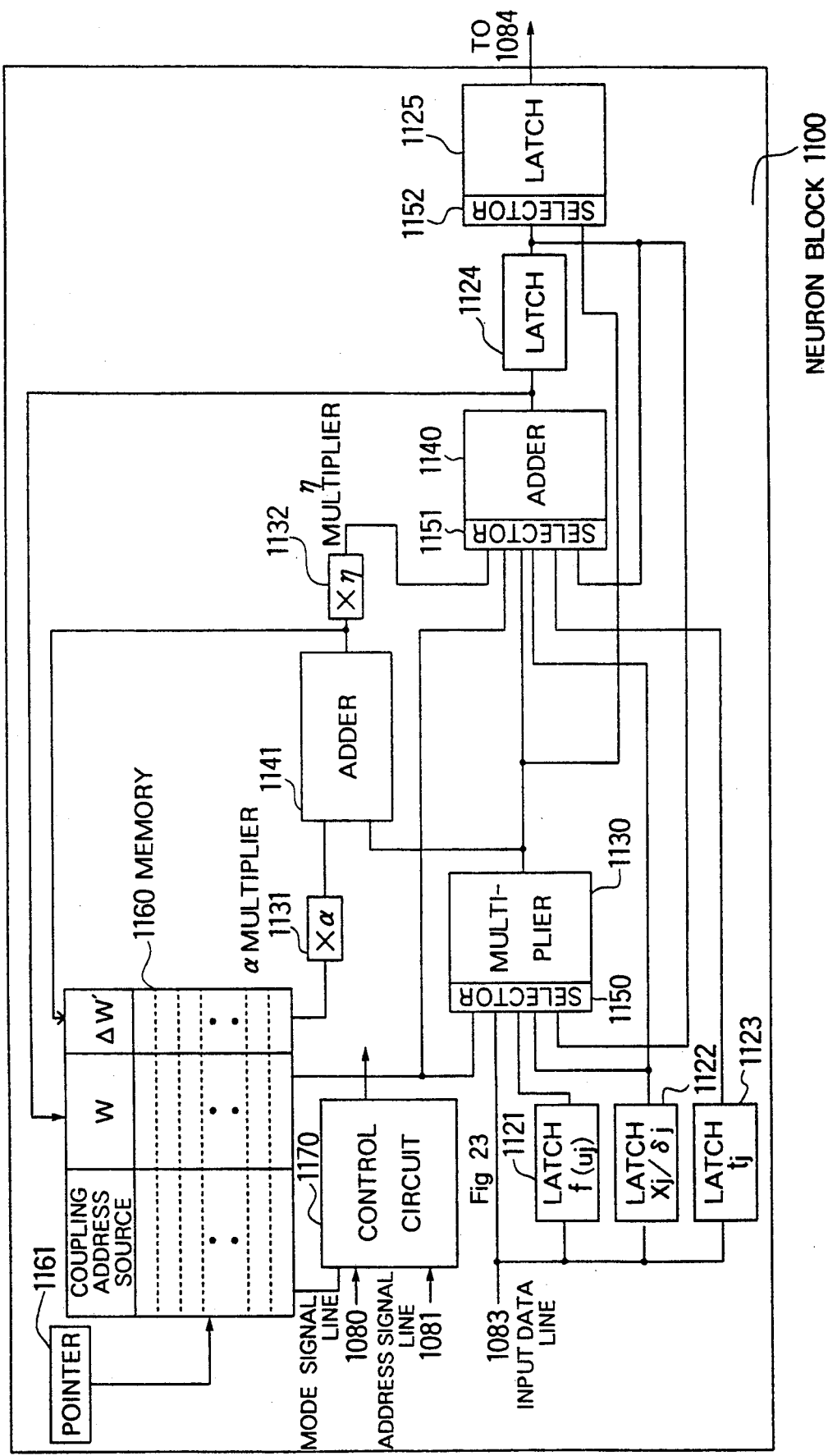
FIG. 18 is a view showing the detail of a neuron block.

FIG. 18 shows the details of the neuron block 1100. In FIG. 18, 1121 to 1125 are latches; 1130 is a multiplier; 1131 is an $\alpha$ multiplier; 1132 is a $\eta$ multiplier; 1140 and 1141 are adders; 1150 to 1152 are selectors; 1160 is a memory; and 1161 is a pointer designating the address in the memory. The memory 1160 stores the address of the neuron block 1100 at a connection source, a coupling coefficient w and a previous modification value $\Delta w'$. 1170 is a control circuit. The latch 1121 is used only when it operates in the backward network, and takes in f'(u) in Equations (4) and (5) sent from the input data line 1083. The latch 1122, when it operates in the forward network, takes in the learning signal $\delta$ in Equation (3) sent from the input data line 1083, whereas the latch 1122, when it operates in the forward network, takes in x in Equation (4) sent from the input data line 1083. The latch 1023 is used only when it operates as the output layer in the forward network and takes in the teacher signal t in Equation (4) sent from the input data line 1083. The selector 1150 selects two of the coupling coefficient w stored in the memory 1160, the input data line 1083, and the latches 1121, 1122 and 1123 to be output to the multiplier 1130. The multiplier 1130 multiplies the input value to be output. The selector 1151 selects two of the $\eta$ multiplier 1132, the coupling coefficient w stored in the memory 1160, the multiplier 1130, and the latches 1122, 1123 and 1124 to be output to the adder 1140. The adder 1140 adds or subtracts the input value to be output. The latch takes in the output from the adder 1140. The selector 1152 selects one of the latch 1124 and the multiplier 1130 to be output to the latch 1125. The latch 1125 provides an output to the output data line 1084 through the selectors 1101 and 1103 (FIG. 17). The $\alpha$ multiplier 1131 multiplies the previous modification value $\Delta w'$ stored in the memory 1160 by a constant $\alpha$ so that the result is output. The adder 1141 adds the outputs from the $\alpha$ multiplier 1131 and the multiplier 1130 so that the result is output. The $\eta$ multiplier 1132 multiplies the output from the adder 1141 by a constant 0 so that the result is output. The memory 1160 takes in a modified coupling coefficient w for the output from the adder 1140 and the modification value $\Delta w'$ for the output from the adder 141. The control circuit 1170 inputs the mode signal line 1080, the address signal line 1081 and the clock signal line 1082 to control the selectors in the neuron block 1100 and the write for the latches and the memory.

Figure 19:
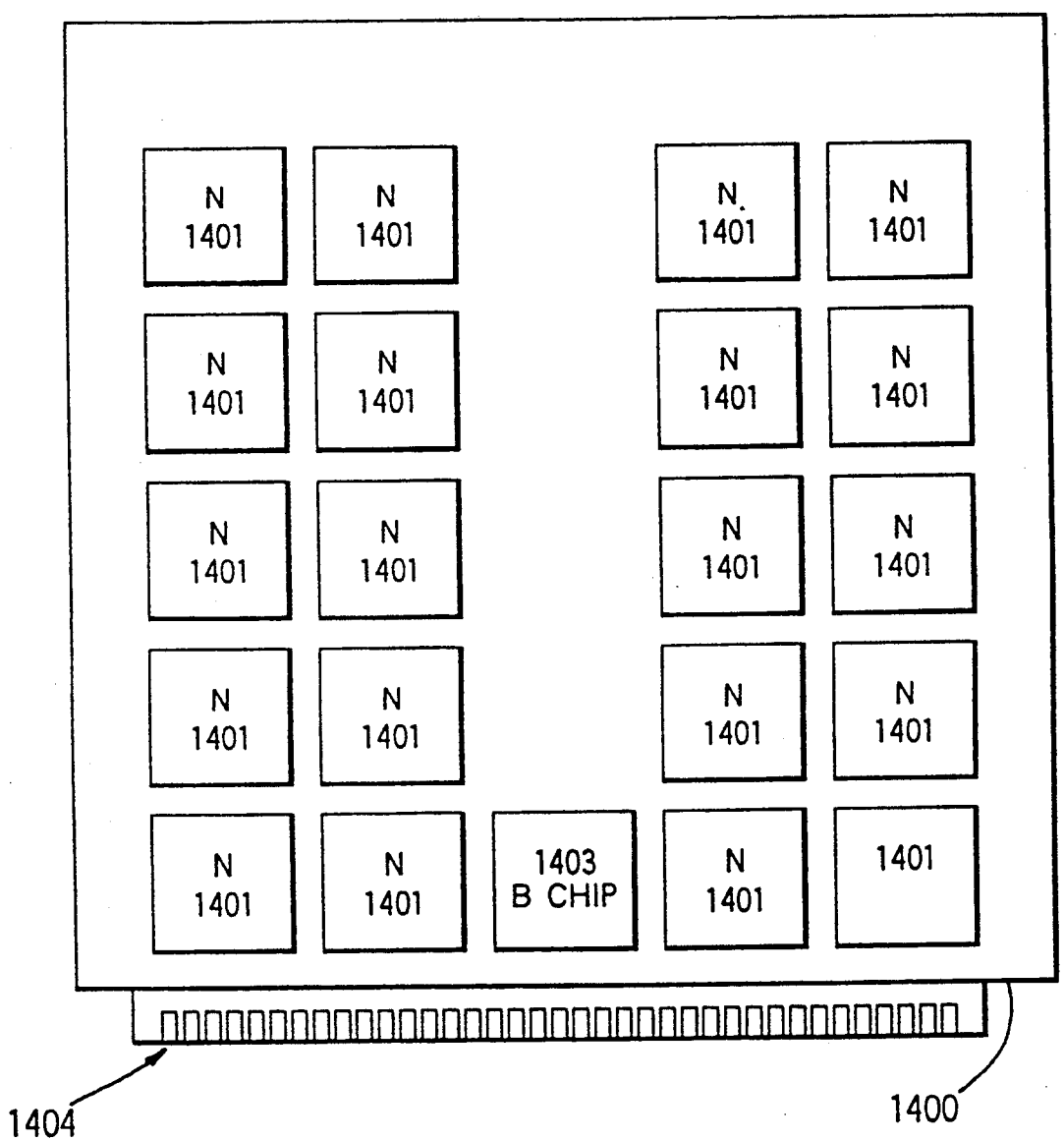
FIG. 19 is a view for explaining the system according to the present invention constructed on a chip.

Although the neuro-computing system in a fashion of WSI has been described, it can be designed in a fashion of chips as shown in FIG. 19. In FIG. 19, 1400 is a chip board; 1401's are N chips; 1403's are B chips; and 1404 is a connector. If the chip board 1400 is substituted for the WSI board 1030 in FIG. 12, the neuro-computing system according to the present invention can be realized. Further, the neuro-computing system can also be designed in a mixed fashion of chips and WSI. The N chip has the same function as that of the N block 1060, and the B chip 1403 has the same function that of the B block 1062. The N chips and the B chips are connected on the chip board 1400 so as to provide the same arrangement as the wafer 1050.

The neuro-computing system of FIG. 12 hitherto explained repeats several operations to execute learning. FIG. 25 is a table showing part of mode signals output to the mode signal line in FIG. 12 with their operation. The system of FIG. 12 performs several operations in accordance with these mode signals. If the mode signal line 1080 is set for the mode signal numbers 1, 3, 5, 8, 9, 11, 13, 15, 17 and 19, initial values can be stored in the corresponding latches and memories. The mode signals of Nos. 24 to 32 are used during the learning. The order of setting them will be described later with reference to FIG. 26. How the system of FIG. 12 operates in accordance with the mode signals as shown in FIG. 25 will be explained below. Attendantly, explanation will be made on the respective operations of the sequence RAM 1013 shown in FIG. 12, the control circuit 1071 shown in FIG. 16, the control circuit 1102 shown in FIG. 17 and the control circuit 1170 shown in FIG. 18.

Figure 20A:
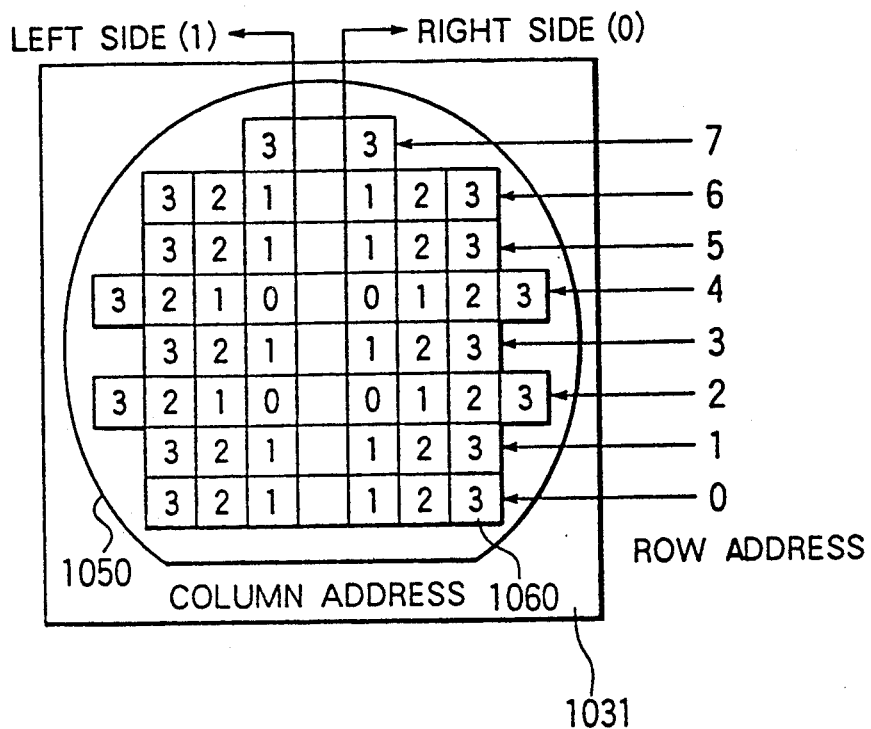
FIGS. 20A, 20B, and 20C are views for explaining several kinds of addresses for accessing to the IO block, the B block, the N block and the neuron block in the N block.
Figure 20C:
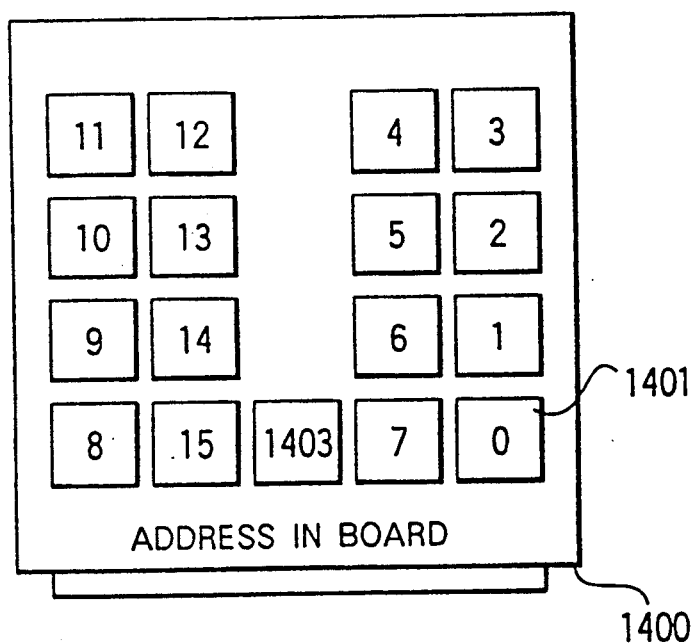
Figure 20B:
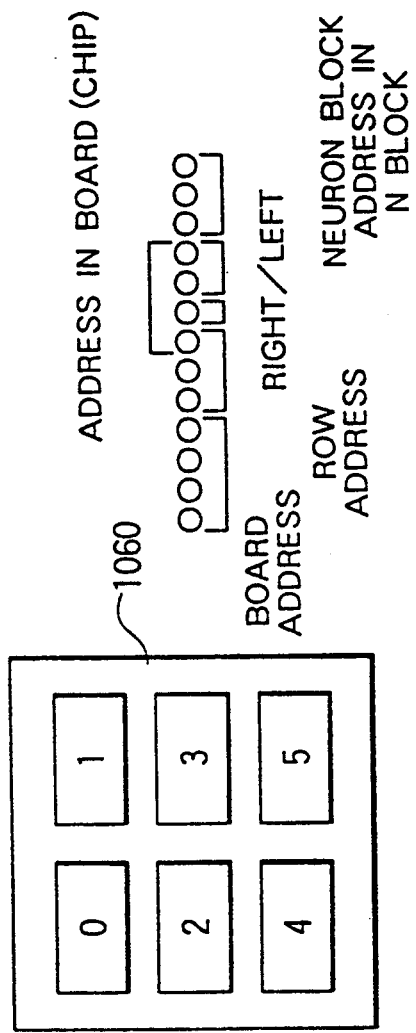

First, referring to FIG. 20, explanation will be given for addresses for accessing the IO block 1061, the B blocks 1062, the N blocks 1060 and neuron blocks 1000 in each of the N blocks. The address 1100 of each of the neuron blocks 1100 serves as a relative address during the learning. WSI has a strong possibility due to its defect that not all the neuron blocks can be used. Further, in the present invention, the neuron blocks 1100 constituting the forward network and the backward network are in one-to-one ratio. Thus, each neuron block is adapted so that it can be set for any relative address. When the neuron block is set for the relative address, it is accessed by an absolute address. FIG. 20 shows, in its upper stage, the absolute address of each of the neuron blocks within the wafer 1050. FIG. 20 shows, in its middle stage, the bit structure of the absolute address. Since the wafer 1050 incorporates 288 neuron blocks 1100 in all, the absolute address within the wafer is constructed by 9 (nine) bits, and 4 (four) bits for a board address are added. It should be noted that the board address is required for the decoder 1085 shown in FIG. 12 and is not required to be sent into the wafer; many boards can be connected by increasing the number of bits for the board address. The 9 bits for the absolute address in the wafer are composed of 3 (three) bits of a row address, 1 (one) bit of a right/left address, 2 (two) bits of a column address, and 3 (three) bits of the address of the neuron block in the N block. The row address indicates either of 0-th to 7-th addresses from the bottom stage of the wafer 1050. The right/left address indicates if the block at issue is located on the right or left side with respect to the center line of the wafer. The column address indicates the column where the block at issue is located. The neuron block address in the N block indicates one of six neuron blocks in the N block 1060. The neuron block address within the N block is shown in middle stage of FIG. 20. The absolute address in the chip board 1400 is shown in the lower stage of FIG. 20.

Figure 21:
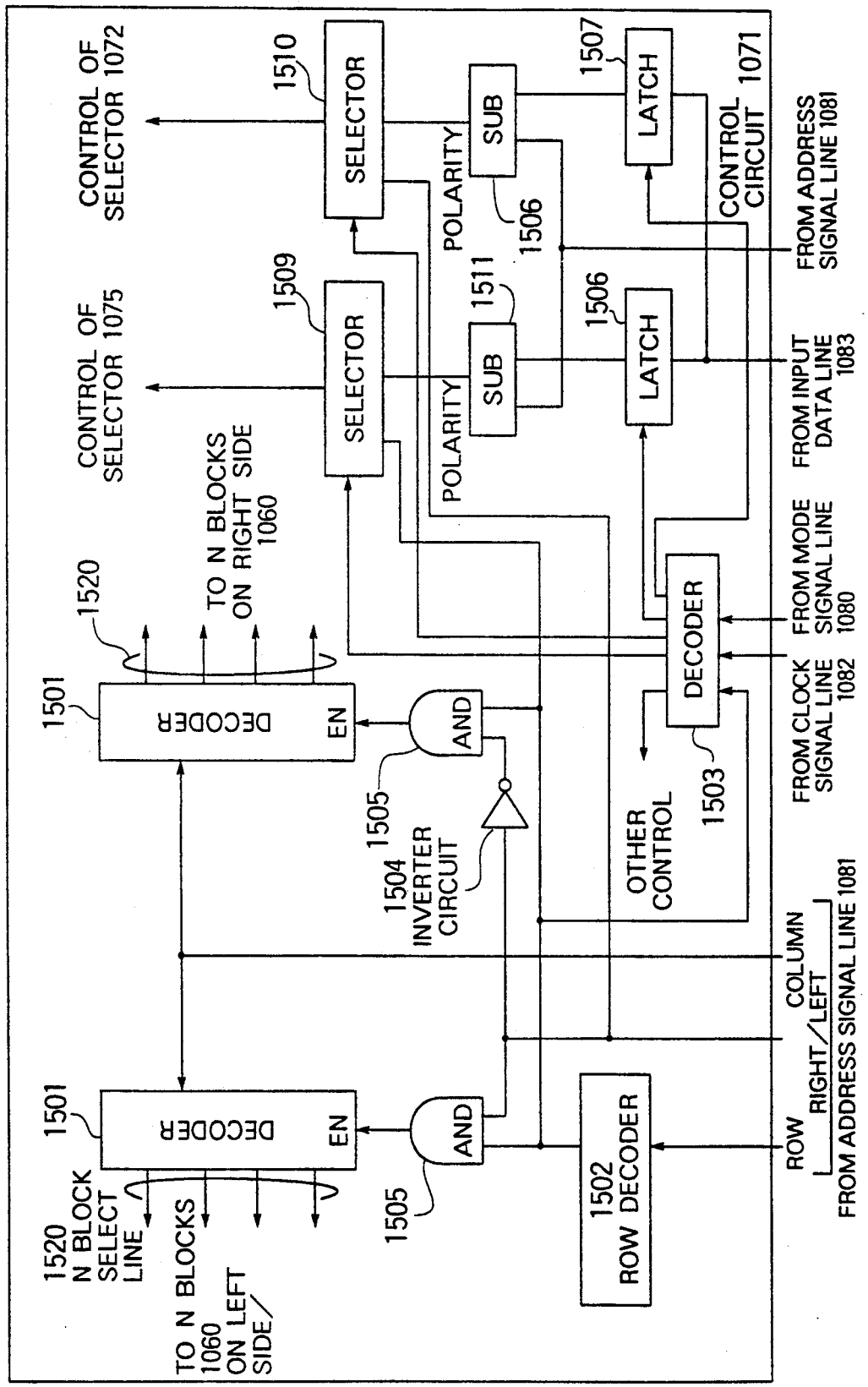
FIG. 21 is a view showing the control circuit in FIG. 16.
Figure 22:
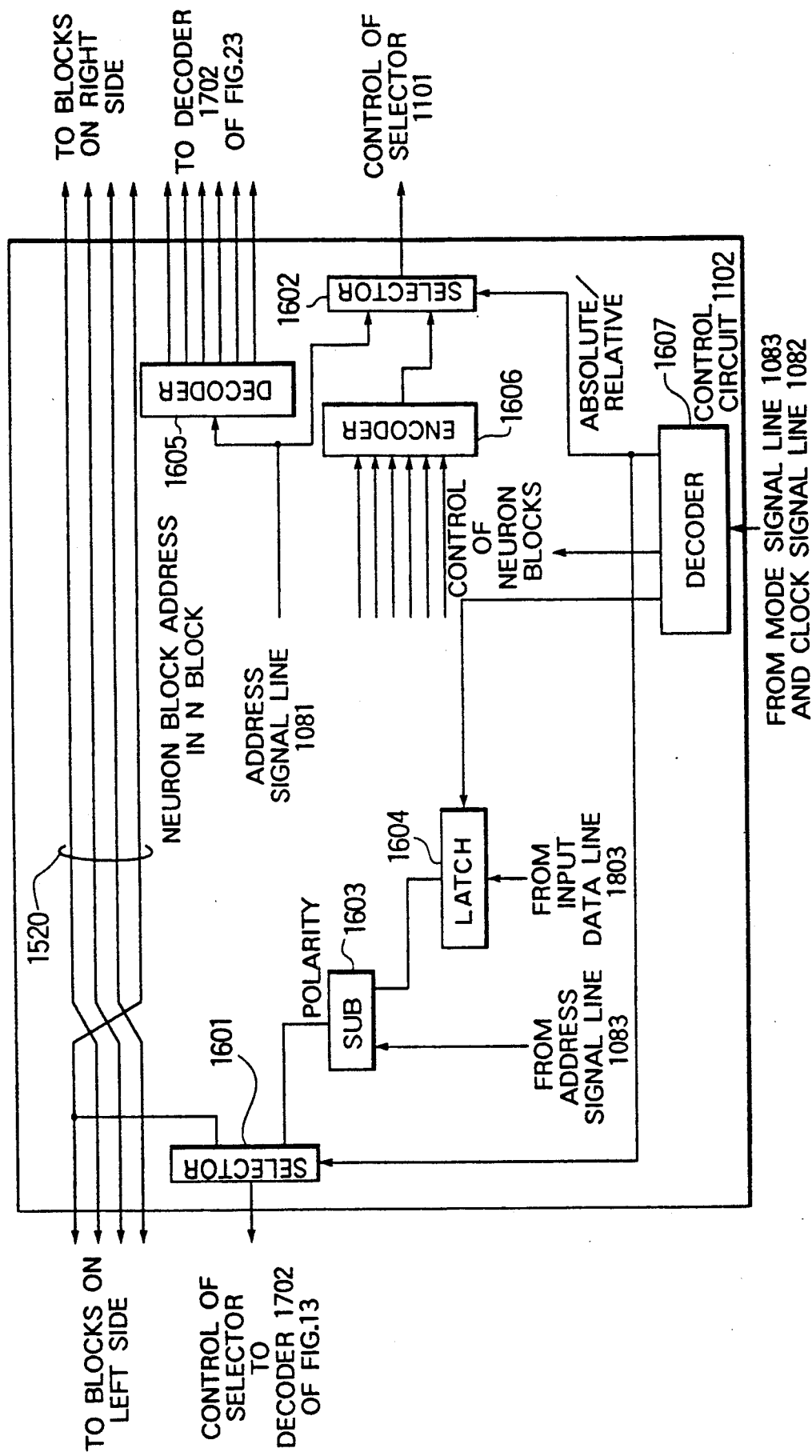
FIG. 22 is a view showing the control circuit in FIG. 17.
Figure 23:
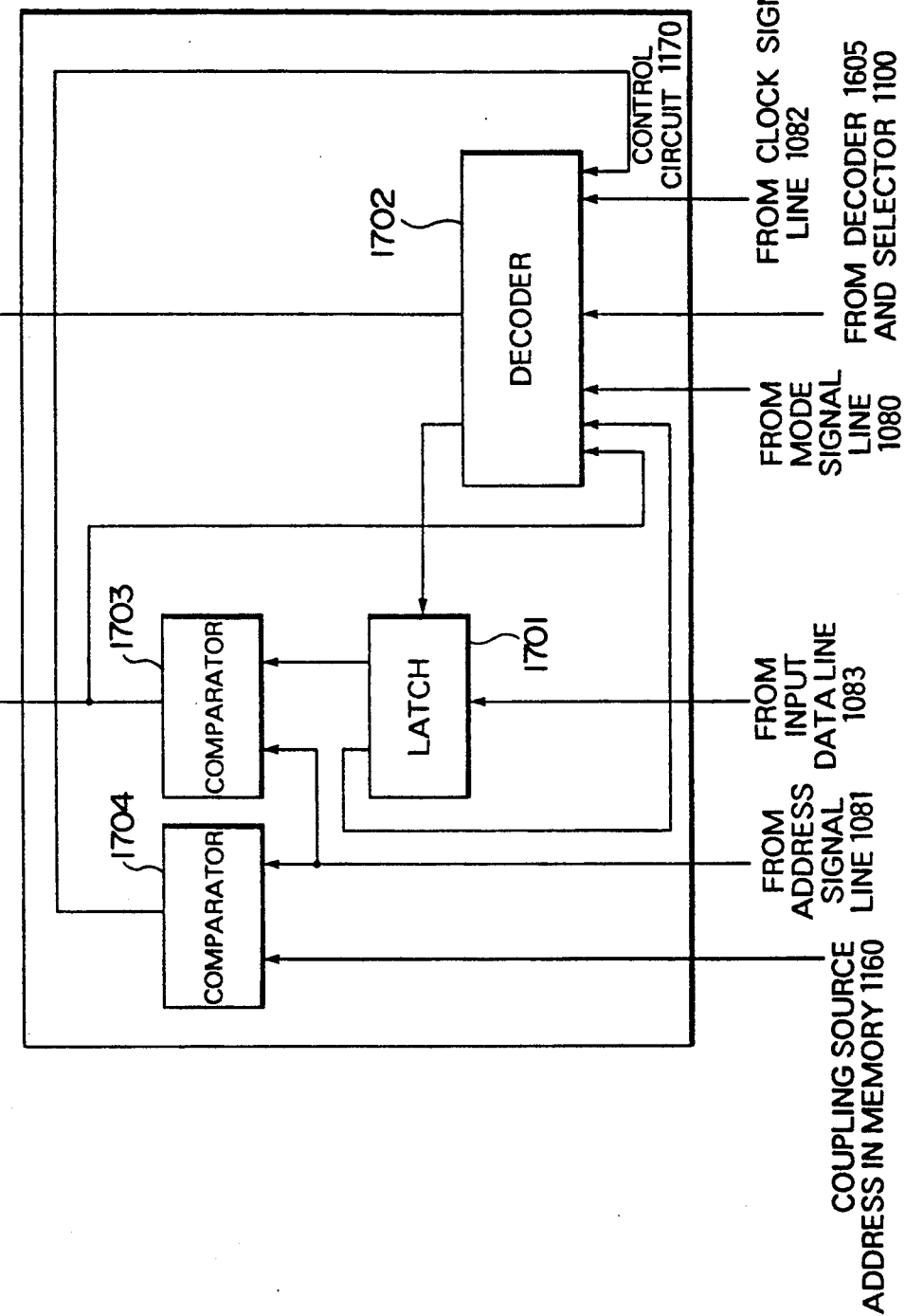
FIG. 23 is a view showing the control circuit in FIG. 18.

FIGS. 21, 22 and 23 show the details of the control circuit 1071 in FIG. 16, the control circuit 1102 in FIG. 17, and the control circuit 1170 in FIG. 18, respectively.

With reference to these three figures, the method for decoding address will be explained below.

In FIG. 21, 1501 is a column decoder for decoding the column address of the absolute address; 1502 is a row decoder for decoding the row address of the absolute address; 1503 is a decoder for decoding the mode signal line; 1506 to 1507 are latches; 1504 is an inverter circuit; and 1505 is an AND circuit. 1511 to 1512 are subtraction circuits for executing subtraction between the relative address sent to the address signal line 1081 and the values previously stored in the latches 1506 and 1507 so that the polarities of the resultant values are output. 1509 to 1510 are selectors for selecting either of the decode result using the absolute address and the decode result using the absolute address so that the selected one is output. The control lines connected from the decode 1503 to the selectors 1509 and 1510 serve to select either of the absolute address and the relative address. 1520's are N block selecting lines.

In FIG. 22, 1607 is a decoder for decoding the mode signal line 1080. 1604 is a latch capable of taking in an output from the input data line 1083; the control therefor is carried out by the decoder 1607. 1603 is a subtraction circuit for executing subtraction between the relative address sent from the address signal line 1081 and the value previously stored in the latch 1604 so that the polarity of the resultant value is output. 1601 and 1602 are selectors. Specifically, the selector 1601 selects either of the N block selecting line 1520 indicative of the decode result of the column address expressed by the absolute address and the decode result expressed by the relative address. The selector 1602 serves to select either of the decode result of the absolute address and that of the relative address in the N block. The control lines connected from the decoder 1607 to the selectors 1601 and 1602 serve to select the absolute result or the relative address. The reason why the N block selecting lines 1520 are twisted to be connected with adjacent blocks is that the N blocks 1060 in each column can be designed in the same pattern; this permits the number of semiconductor masks and the design man-power to be reduced. 1605 is a decoder for decoding the neuron address in the N block expressed by the absolute address from the address signal line 1081. 1606 is an encoder for encoding the decode result of the address of each of six neuron blocks 1100.

In FIG. 23, 1701 is a latch for taking in the relative address of the neuron block at issue output to the input data line 1083. The latch 1701 further takes in the information on if the neuron block at issue operates in the forward network or the backward network. In case that the neuron block operates in the backward network, the latch 1701 takes in the information on if the neuron block belongs to the hidden layer or the output layer. 1703 is a comparator circuit for comparing the relative address output to the address signal line 1081 with the relative address of the neuron block at issue previously stored in the latch 1701 to send to the decoder 1702 the information on if or not they coincide with each other. The information is also sent to the encoder 1606 in FIG. 22. 1704 is a comparator circuit for comparing the coupling source address stored in the memory 1160 in FIG. 18 with the relative address output to the address signal line 1081. 1702 is a decoder for receiving the signals from comparator circuit 1703, the latch 1701, the mode signal line 1081, the decoder 1605 in FIG. 21, the clock signal line 1082, the comparator circuit 1703, the selector 1601 in FIG. 22 to control the selectors, the latches, the memory, the pointer in the neuron block 1100 and the latch 1701 in FIG. 23.

Although FIG. 25 shows only the mode signals necessary to explain the operation of the neuro-computing system, the mode signals for read/write for the latches and the memories are also set for checking the system.

First, using an absolute address for initialization, a relative address, and 2 bits of the information indicative of the forward network or the backward network, and the hidden layer or the output layer are stored in the latch 1701 of the control circuit 1170 in FIG. 23 in each of the neuron blocks 1100. The host computer 1000 set the selectors 1051 and 1052 in FIG. 12 for the side of the external bus 1021. The mode signal line 1080 is set for No. 17 to set the absolute address of the neuron block 1100 to be accessed on the address signal line 1081. The value to be stored is set on the input data line 1083. Control is made on the WSI board 1030 so that the decoder 1085 decodes the board address and only if the decoded board address is its own board, write is executed for the latches and the memories for the wafer 1050.

In the operation using the absolute address, the row decoder 1502 in FIG. 21 can decode the row address to exhibit if the row at issue has been selected. The column decoder 1501 can select a column address to select one of one to four N blocks 1060 in a direction the selected row using the N block selecting lines 1520 connected with the column decoder. The right/left address serves to decide if the neuron block is on the right or left side. The result from the row decoder 1502 and the right/left address are AND-ed by the AND circuit 1505 to provide an enable signal to the decoder 1501 on the left side. Further, the result form the result from the row decoder 1502 and the logic inversion of the right/left address are AND-ed by the inverter circuit 1504 are AND-ed by the AND circuit 1505 to provide an enable signal. In the selected N block 1060, the decoder 1605 in FIG. 22 decodes the neuron block address in the N block to provide the result to the control circuit 1170 in FIG. 23 in each of the neuron blocks. The N block selection result by the selector 1601 is also sent to the control circuit 1170. If the mode signal is set for No. 17, and also the neuron block at issue is selected, the value output to the input data line 1083 is taken in the corresponding latch 1701 under the control of the decoder 1702 of the control circuit 1170. In this way, the write for the latches 1701 in all the neuron blocks is terminated. It should be noted that the relative address in the same wafer is increased in accordance with its absolute address (from small to large). In this case, any vacant number may exist. This affects with the method for controlling the output data line 1084 described below.

Next, setting is made for the latch 1604 (FIG. 22) in each of all the N blocks 1060. The mode signal is set for No. 15 to store in the latch 1604 the largest e relative address set in the neuron blocks within the N block. The host computer 1000 sets the mode signal line 1080 for No. 15 and the absolute address of the N block 1060 on the address signal line. The address of the neuron block in the N block is not required to be set. The value to be stored is set onto the input data line 1083. The output data line 1084 for the N block 1060 during the operation based on the relative address, namely the selector 1103 in FIG. 17 is controlled on the basis of the polarity bit which is a result of subtraction of the latch 1604 from the address signal line 1081. The largest relative address of the neuron blocks in the corresponding N block is stored in the latch 1604 so that the neuron blocks 1100 outside the N block at issue are set for the relative address larger than the value stored in the latch 1604. Therefore, if the address signal line 1081 has a value larger than that of the latch 1604, the selector 1103 selects the output data line 1084 connected with the adjacent N block 1060.

Next, stored in the latch 1507 (FIG. 21) in the IO block 1061 and each of all the B blocks 1062 is the largest relative address set in the neuron block 1100 on the corresponding row. The host computer 1000 sets the mode signal line 1080 for No. 11 and sets the row address (absolute address) of the Io block 1061 or the B block on the address signal line 1081. The right/left address, the column address and the neuron address in the N block are not required to be set. The value to be stored is set on the input data line 1083.

The output data line 1084 for the IO block 1061 and the B block 1062, namely the selector 1075 is controlled on the basis of the polarity bit which is a result of subtraction of the latch 1507 from the address signal line 1081. The largest relative address of the neuron blocks 1100 on the corresponding row is stored in the latch 1507 so that the relative address larger than that of the latch 1507 is stored in the neuron blocks over the block at issue. Therefore, if the address signal line 1081 has the value larger than that of the latch 1507, the selector 1075 in FIG. 16 selects the output data line 1084 connected with the B block 1062 over the block 1062 at issue.

Next, stored in the latch 1506 (FIG. 21) in the IO block 1061 and each of all the B blocks 1062 is the largest relative address set in the neuron block 1100 on the right side of the corresponding row. The host computer 1000 sets the mode signal line 1080 for No. 13 and sets the row address (absolute address) of the IO block 1061 or the B block on the address signal line 1081. The right/left address, the column address and the neuron address in the N block are not required to be set. The value to be stored is set on the input data line 1083. The selector 1072 is controlled on the basis of the polarity bit which is a result of subtraction of the latch 1506 from the address signal line 1081 in the subtraction circuit in FIG. 21. The largest relative address of the neuron blocks 1100 on right side of the corresponding row is stored in the latch 1506 so that the relative address larger than that of the latch 1506 is stored in the neuron blocks on the left side of the block at issue. Therefore, if the address signal line 1081 has the value larger than that of the latch 1506, the selector 1072 in FIG. 16 selects the output data line 1084 connected with the B block 1062 on the left side of the block 1062 at issue.

Next, write is executed on the conversion table (FIG. 16) the IO block and the B blocks 1062. Specifically, the conversion table 1070 for the wafer 1050 constituting the forward network performs f conversion in Equation (1) whereas the that for the wafer 1050 constituting the backward network performs f′ conversion in Equations (4) and (5).

The host computer 1000 sets the mode signal line 1080 for No. 9, and sets the row address (absolute address) of the IO block 1061 or the B block 1062 to be accessed on the address signal line 1081. The addresses to be accessed on the conversion table 1070 are set for the bits for the right/left address, the column address and the neuron block address in the N block. If 7 bits allotted are not sufficient, the number of bits allotted on the address signal line 1083 is increased. The value to be stored is set on the input data line 1083. The IO block 1061 and each of the B blocks 1062 decodes the row address by the row decoder 1502; if the block itself at issue is selected, the value on the input data line 1083 is stored on the conversion table 1070.

Next, in FIG. 12, the outputs from the input layer neurons are stored in the input layer memory 1010, and teacher signals are stored in the teacher signal memory 1012. Generally, the neural network learns several patterns so that the input layer memory 1010 is segmented for each of the patterns. Likewise, the teacher signal memory 1012, which stores the teacher signal corresponding to each pattern, is also segmented. The segment to be accessed is changed in accordance with each learning pattern. The host computer 1000 sets the mode signal line 1080 for Nos. 1 and 3, and sets addresses on the address signal line 1081 so that a value is stored in each of the memories.

Next, the initial values of a coupling coefficients are stored in the memory 1160 of the neuron block 1100 to be used. The mode signal line 1080 is set for No. 19. After the address of the neuron block 1100 to be accessed is set on the address signal line 1081, the write address in the memory 1160 is set thereon and the value to be stored is set on the input data line. The address signal line 1081 may be used in a time-divisional manner like this. Otherwise, first, with the pointer 1161 set for 0, the value may be stored from the address 0 in the memory 1160, and the values may be stored for each sequential increment of the pointer.

Stored in the memory 1160 are the relative address of the neuron block 1100 to be coupled, the coupling coefficient w therefor and a previous modification value $\Delta w'$. The initial value of the modification value may be 0. In interrupting the learning to read out the result in progress and resuming the learning, a necessary value will be stored correspondingly. The initial values of the corresponding coupling coefficients in the forward network and the backward network must be set for the same value.

Figure 24:
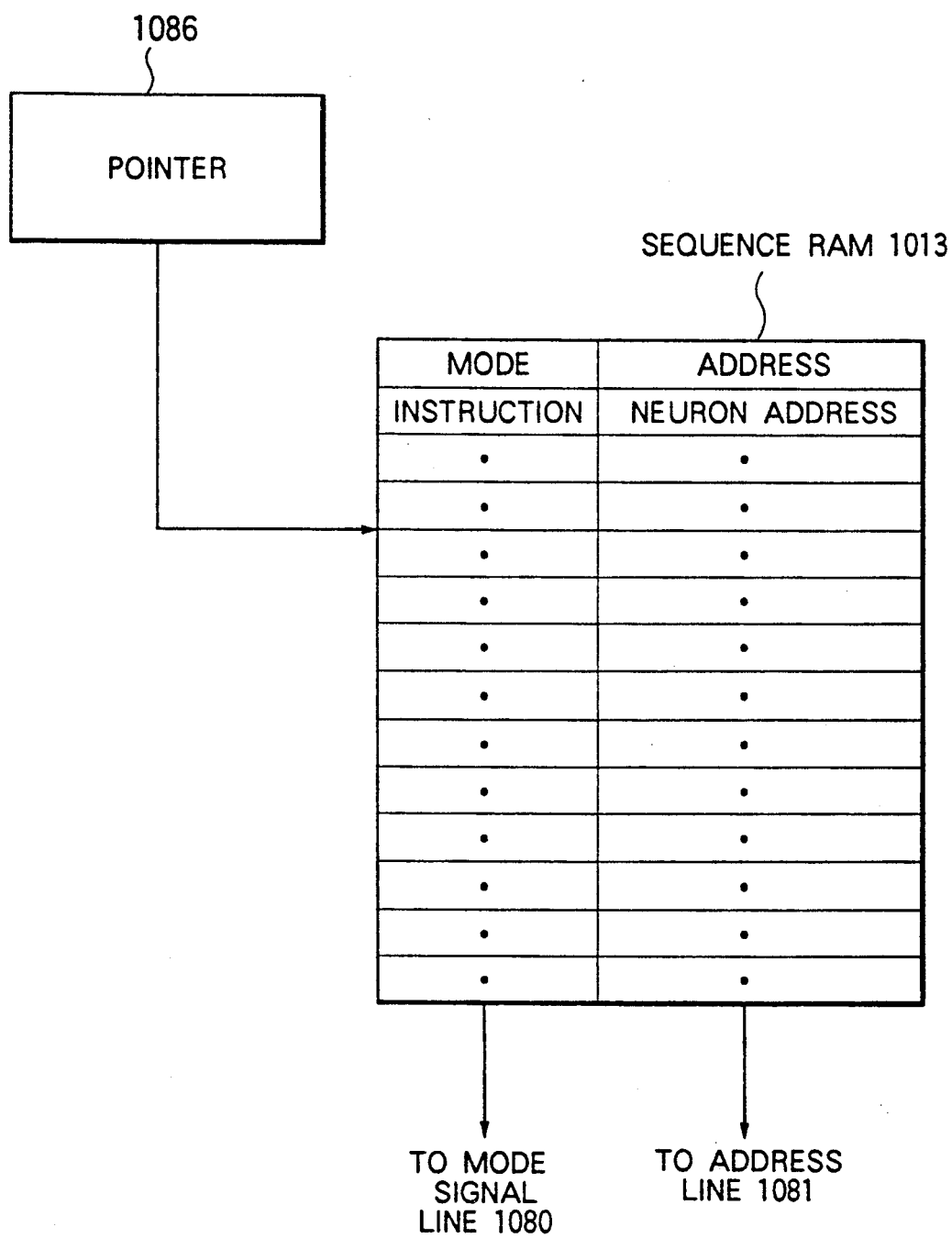
FIG. 24 is a view for explaining a sequence RAM.

Next, as shown in FIG. 24, a series of mode signals for performing the learning and the relative addresses of the neuron blocks 1100 to be output are stored in the sequence RAM 1013 (FIG. 12).

FIG. 26 is an example thereof in which the sequence RAM 1013 is prepared to perform the learning for the neural network composed of three input layer neurons, two hidden layer neurons, and two output layer neurons. FIG. 26 is directed to the learning of one pattern; in the case of two or more patterns, the input memory and the teacher signal memory must be segmented in accordance with each pattern.

The learning operation will be explained below with reference to FIG. 26. It is assumed that the relative addresses of the input layer neurons are set for 0 to 2, those of the hidden layer neurons are set for 3 to 4, and those of the output layer neurons are set for 5 to 6. Two sheets of boards are used; the board address of one board constituting the forward network is set for 3 whereas that of the other board constituting the backward network is set for 4.

Since no input layer neuron is required in the backward network, eight neuron blocks 1100 are used in total. It is assumed that the board addresses of the input memory and the teacher signal memory are 0 and 1, respectively.

First, the pointer 1086 is reset. The sequence RAM outputs an instruction and an address stored at the address 0 to the mode signal line 1080 and the address signal line 1081, respectively. Then, the mode signal line 1080 is set for No. 24 to set an address 5 on the address signal line 1081. The board address is set for 1. The decoder 1085 decodes the board address to output the output from the teacher signal memory 1012 to the input data line 1083 through the output buffer 1040. The teacher signal memory 1012 outputs the value at the address 5 designated on the address signal line 1081. The neuron block 1100 having the relative address 5 in the output layer in the backward network takes its own teacher signal output to input data line 1083 into the latch 1123 (FIG. 18). Likewise, the same thing applies to the neuron block 1100 having the relative address 6 in the output layer in the backward network.

Now it should be noted that in order to perform the write for the latches and memories, hold times for addresses and data to be stored are required. To this end, timings of write-enable signals therefor are produced on the basis of the clock signal on the clock signal line 1082.

When a clock is input from the clock signal line 1082, the pointer 1086 in FIG. 12 advances by one to execute a next instruction. The mode signal line 1080 is set for No. 25 to reset the pointer 1161 in FIG. 18. The latch 1124 in the neuron block 1100 in FIG. 18 is reset.

The next instruction executes a forward operation. The mode signal line 1080 is set for No. 26. The address signal line 1081 is designated by the neuron blocks 1100 in the order of the relative address (from small to large) from the input layer toward the output layer. As for the board address, 0 is set in the input layer and 3 is set in the hidden layer and the output layer. The designated input memory 1010 outputs the values stored therein to the input data line 1083 to be broadcast to all the neuron blocks 1100. In each of the neuron blocks 1100, the decoder 1702 (FIG. 23) decodes the mode signal line 1080 set for No. 26 to control the selectors in the neuron block 1100 of FIG. 18. The selector 1150 supplies the coupling coefficient w stored in the memory 1160 and the input data line 1083 to the multiplier 1130. The multiplier 1130 performs a synapse operation of the coupling coefficient and the output x, i.e. the multiplication therebetween. The selector 1151 connects the multiplier 1130 and the latch 1124 with the adder 1140. The output from the latch 1124 is written into the latch 1124. The selector 1152 selects the latch 1124 so that the latch 1125 takes in the value therefrom. The comparator circuit 1704 in the control circuit 1170 (FIG. 23) compares the coupling source address stored in the memory 1160 with the address output on the address signal line 1181; if they are coincident with each other, the outputs from the latch 1124 and the multiplier 1130 are added so that the result is written into the latch 1124. Then, the pointer 1161 in FIG. 18 is advanced by one. In this way, the relative address of the input source sent to the address signal line and the value from the source sent to the input data line 1083 are sequentially input to perform cumulative addition. The coupling source addresses are previously stored in the order (from small to large) in the memory 1160. Further, the comparator 1703 (FIG. 23) compares the address signal line 1083 with the relative address of the pertinent neuron block stored in the latch 1701 (FIG. 23); if they are coincident with each other, the result of the cumulative addition, i.e. the internal energy u of from the latch 1125 is sent to the selector 1072 (FIG. 16) through the selectors 1101, 1103 and the output data line 1084 (FIG. 17). The decoder 1503 (FIG. 21) in the IO block 1061 or the B block 1062 decodes the mode signal line 1080 set for No. 26. Then, the selector 1073 selects the side of the selector 1072 and the selector 1074 selects the side of the conversion table 1070. The selector 1076 selects the side of the input data line 1083 so that the input data line 1083 extended from the lower side is connected, as it is, with the N blocks 1060 on the sides of the pertinent B block. The selectors 1072 and 1075 control the address signal line 1081 in the manner described above. Thus, the internal energy u which is an output from the neuron block 1100 with the relative address designated is sent to the conversion table 1070 on the corresponding row. The conversion table 1070 converts the internal energy u into the neuron output x which is in turn sent to the control board to the control board 1003 in FIG. 12 through the output data line 1084. The selector 1052 in FIG. 12 supplies the value on the output data line 1084 to the input data line 1083 as it is.

In the backward network in this mode, when in FIG. 18, the relative address of the pertinent neuron block is output on the address signal line, the value on the input data line 1083 is taken into the latch 1122.

Next, with the mode signal line set for No. 27, the relative addresses in the hidden layer and the output layer are sequentially set on the address signal line 1081. The neuron block 1100 with the relative address designated in the forward network sends again the contents of the latch 1125 in FIG. 18, i.e. the internal energy u to the IO block 1061 (B clock 1062) shown in FIG. 16. In this mode No. 27, the selector 1074 in the IO block 1061 (B block 1062) selects the side of the selector 1072. Therefore, the internal energy u is sent, as it is, to the output data line 1084 on the lower side. The manner of decoding the address signal line 1081 is the same as in the mode No. 26. The internal energy u is sent to the output data line 1084 through the control board in FIG. 12. On the other hand, the internal energy u sent through the input data line 1083 is f'-converted by the conversion table 1070 to provide f'(u) which is in turn sent to the N blocks on the sides of the pertinent B block 1062 through the input data line 1083. If in the neuron block 1100 of FIG. 18 in the backward network, the address output to the address signal line 1081 is coincident with its own relative address, f'(u) output to the input data line 1083 is taken in the latch 1121.

Next, the mode signal line 1080 is set for No. 28. The neuron block 1100 in the output layer in the backward network sets the selectors incorporated therein as follows. In FIG. 18, the selector 1151 connects the latches 1122 and 1123 with the adder 1140. The adder 1140 computes $(t-x)$ so that the result is taken in the latch 1124. The selector 1150 connects the latches 1124 and 1121 with the multiplier 1130. The multiplier 1130 multiplies $(t-x)$ from the latch 1124 by $f'(u)$ from the latch 1121 to provide the learning signal δ. The selctor 1152 sends the output from the multiplier 1130 to the latch 1125 so that the learning signal δ taken therein.

Next, the mode signal line 1080 is set for No. 25 to reset the pointer 1161 in FIG. 18. The latch 1124 in the neuron block 1100 of FIG. 18 is reset.

Next, the mode signal line 1080 is set for No. 29 to set the relative address in the output layer in the order (from small to large) on the address signal line 1081. The neuron block 1100 (FIG. 18) with the relative address designated in the backward network sends the contents of the latch 1125, i.e. the learning signal δ in the output signal to the Io block (B block) of FIG. 16.

In the mode No. 29, the selector 1074 (FIG. 16) in the IO block (B block) selects the selector 1072 so that the learning signal δ is output to the output data line 1084 as it is. It should be noted that the address signal line 1080 is decoded in the same manner as in the mode No. 26. The learning signal δ is output to the input data line 1083 through the control board 1003 in FIG. 12. The IO block 1061 (B block 1062) in the forward network sets the selector 1076 (FIG. 16) for the side of the input data line 1083 connected with the lower side of the IO block at issue. The learning signal sent from the backward network is sent to the N blocks 1060 of the sides of the pertinent IO block. If in the neuron block 1100 (FIG. 18) in the forward network, the address output to the address signal line 1081 is coincident with its own relative address, the learning signal δ output to the input data line 1083 is taken in the latch 1122.

On the other hand, in the neuron 1100 in the hidden layer in the backward network, the selector 1150 (FIG. 18) connects the coupling coefficient w and the input data line 1083 with the multiplier 1130 which multiplies the learning signal δ by the coupling coefficient w. The selector 1151 conencts the multiplier 1130 and the latch 1124 with the adder 1140. The latch 1124 takes in the output from the adder 1140. The comparator 1704 (FIG. 23) compares the coupling source address output from the memory 1160 with the address on the address signal line 1081; if they are coincident with each other, the outputs from the latch 1124 and the multiplier 1130 are added so that the result is taken in the latch 1124. Then, the pointer 1161 is advanced by one. In this way, the relative address of the input source sent to the address signal line and the value from the source sent to the input data line 1083 are sequentially input to perform cumulative addition of Σw·δ.

Next, the mode signal line 1080 is set for No. 30. The neuron block 1100 in the output layer in the backward network sets the selectors incorporated therein as follows. In FIG. 18, the selector 1150 connects the latches 1124 and 1121 with the multiplier 1130. The multiplier 1130 multiplies Σw·δ by f'(u) to provide the learning signal δ in the hidden layer. The selector 1152 supplies the output from the multiplier 1130 to the latch 1125. So the learning signal 6 is taken in the latch 1125.

Next, the mode signal line 1080 is set for No. 29 to broadcast the learning signal δ in hidden layer to all the neuron blocks 1100. In the neuron block 1100 in the forward network, the comparator 1703 compares the value on the address signal line 1081 with its own address taken in the latch 1701 in FIG. 23; if they are coincident with each other, the learning signal δ is taken in the latch 1122.

Incidentally, in the case where the hidden layer is composed of two or more layers, the instruction in the mode No. 30 may be executed again to compute the learning signal δ which is to be sent to the forward network in the mode No. 29.

Next, the mode signal line 1080 is set for No. 25 to reset the pointer 1161 in FIG. 18.

Next, the mode signal line 1080 is set for No. 31 to designate the address signal line 1081 in the order of the relative address (from small to large) from the input layer toward the hidden layer. With respect to the input layer, the value of the neuron block in that layer is output form the input layer memory 1160. With respect to the hidden layer, the neuron block in that layer in the forward network f-converts its internal energy u using the conversion table 1070 in the IO block 1061 (B block 1062) so that the result is broadcast. The neuron block 1100 (FIG. 18) in the forward network set the selectors incorporated therein as follows. The selector 1150 connects the latch 1122 and the input data line 1083 with the multiplier 1130 which multiplies the learning signal δ by the output x from the neuron block. The selector 1151 connects the coupling coefficient w from the memory 1160 and the η multiplier 1132 with the adder 1140. The α multiplier 1131 multiplies the previous modification value Δw from the memory 1160 by α to provide αΔw'. The adder 1141 adds the output δ·x from the multiplier 1130 and the output αΔw' so that the result is sent to the η multiplier 1132. Thus, the η multiplier produces a modification value. The output from the adder 1141 before it is multiplied by α is stored in the column Δw'. Thus, the modified coupling coefficient w and the modification value Δw' result as follows:

$$w_{ji}^{n+1} = w_{ji}^{n} + \eta \cdot \Delta w'_{ji}^{n+1} \qquad (6)$$

$$\Delta w'_{ji}^{n+1} = \delta_j x_j + \alpha \cdot \Delta w'_{ji}^{n+1} \qquad (7)$$

The constant η covers a wide range of values so that the number of bits of Δw' to be stored in the memory 1160 can be reduced. The adder 1140 modifies the coupling coefficient w so that the result is stored in the memory 1160. The above modification operation is carried out when the comparator 1704 in FIG. 23 confirms that the coupling source address from the memory 1160 is coincident with the address on the address signal line 1081.

Next, the mode signal line 1080 is set for No. 25 to reset the pointer 1161 in FIG. 18.

Next, the mode signal line 1080 is set for No. 32. The relative address of the neuron block 1100 in the output layer in the backward network is set on the address signal line 1081 to broadcast the learning signal. If the hidden layer is composed of two or more layers, the learning signal δ in the hidden layer is also broadcast. The selectors incorporated in the neuron block 1100 (FIG. 18) in the backward network are set in the same way as in th case of the modification of the coupling coefficient w in the mode No. 31. The selector 1130 multiplies the neuron output x from the latch 1122 by the learning signal δ output to the input data line 1083. Further, the modification value δw' and the modified value are stored through the η multiplier 1132, the adder 1140, the α multiplier 1131 and the adder 1141.

The operations hitherto explained are carried out for a different segment in the input memory 1010 and the teacher memory 1012 in accordance with each of the learning patterns, thus executing the learning. The output layer memory 1011 takes in the outputs from the output layer neurons in the forward network output to the output signal line 1084. The host computer 1000 can read the output layer memory 1011 through the external bus 1021 to examine if the outputs therefrom are expected values.

Proposed as an application of the neuro-computing system of FIG. 12 is a system in which a handwritten character input from the digitizer 1001 is used as an input to the neural network with the coordinate of the input character normalized by the host computer 1000, thus recognizing the handwritten character. The time required to learn once one pattern of the hierarchical neural network including p neurons in the input layer and q neurons in the hidden layer and r neurons in the output layer can be substantially expressed by $$(2p + 4q + 5r) \cdot t(s) \qquad (8)$$

where the time required to execute the cumulative addition once. For example, assuming that for recognition of a handwritten character, p is 256 (16 dots × 16 dots), q is 100, r is 26 and t is 100 ns, one pattern can be executed once for a short time of about 0.1 ms. Therefore, even if the learning must be repeated 1000 times to learn one character, the pattern composed of 10 characters can be learned in a very short time of one second.

We claim:

1. An information processing apparatus comprising:
   a first network comprising:
   an input layer for inputting external input signals, holding said external input signals and outputting said external input signal as output signals,
   a first hidden layer for inputting said outputs signals of said input layer, computing first output results of models simulating operation of neurons from said output signals of said input layer, outputting said first output results and including first modification means for modifying synaptic weights of said neuron models, and
   a first output layer for inputting said firs output results, computing second output results of said neuron models from said first output results, outputting said second output results of said models and including second modification means for modifying synaptic weights of said neuron models,
   said first network processing said external input signals in an order of said input layer, said hidden layer and said output layer to determine output values of said first network;
   a second network comprising:
   a second output layer including first learning signal computation means for computing first learning signals of said neuron models and outputting said first learning signals, and
   a second hidden layer including second learning signal computation means for computing second learning signals of said neuron models, and third modification means for modifying synaptic weights of said neuron models,
   said second network receiving desired output values and processing said desired output values in an order of said second output layer, and said second hidden layer to determine learning signals of said second network; and
   communication means for communicating data between said first network and said second network;
   wherein respective values proportional to respective products of said respective output results of said neuron models and said respective learning signals are added to said synaptic weights to modify said synaptic weights by said first, second and third modification means respectively through communications of data regarding said output results of said neuron models and said learning signals between said first network and said second network by said communication means.

2. An information processing apparatus according to claim 1, wherein said information apparatus is constructed on a sheet of wafer scale integrated circuit.

3. An information processing apparatus according to claim 1, wherein said first network is constructed on a sheet of a first integrated circuit, and said second network is constructed on a sheet of a second integrated circuit.

4. An information processing apparatus, comprising:
   a first network comprising:
   a plurality of first function blocks for serving as an input layer, and
   a plurality of second function blocks for serving as a hidden layer and an output layer, wherein the output from each of said first function blocks and each of said second function blocks being determined in an order of said input layer, said hidden layer and said output layer;
   a second network comprising
   a plurality of third function blocks corresponding to said second function blocks in the hidden layer and the output layer which constitute said first network, wherein the output rom each of said third function blocks being determined in the order of the output layer and the hidden layer; and
   means for communicating between corresponding ones of said second function blocks and said third function blocks.

5. An information processing apparatus according to claim 1 or 4, further comprising at least one data bus for performing communication between said first function blocks and said second function blocks, among said second function blocks, among said third function blocks, and between corresponding ones of said second function blocks and said third function blocks.

6. An information processing apparatus according to claim 4 wherein said information apparatus is constructed on at least on a sheet of wafer scale integrated circuit.

7. An information processing apparatus according to claim 4, wherein said first network is constructed on at least one sheet of a first integrated circuit, and said second network is constructed on at least one sheet of a second integrated circuit.

8. An information processing apparatus according to claim 4, wherein said plurality of first function blocks and said plurality of second function blocks have the same circuit construction.

9. An information processing, apparatus comprising:
   a first network comprising:
   a plurality of first function blocks for serving as an input layer, and
   a plurality of second function blocks for serving as a hidden layer and an output layer, wherein the output rom each of said first function blocks and each of said second function blocks being determined in an order of said input layer, said hidden layer and said output layer;
   a second network comprising:
   a plurality of third function blocks corresponding to said second function blocks in the hidden layer and the output layer which constitutes said first network, said third function blocks holding synapse weights for the output layer, the output from each of said third function blocks being determined in the order of the output layer and the hidden layer; and
   means for communicating between corresponding ones of said second function blocks and said third function blocks;
   wherein synapse weights held by said first network and those held by said second network are in a one-to-one ratio and have the same values, and said weights are modified separately in said first and second networks but modified to the same values.

10. An information processing apparatus according to claim 9 further comprising at least one data bus which performs communication between said first function blocks and said second function blocks, among said second communication blocks, among said third communication blocks, and between corresponding ones of said second function blocks and said third function blocks.

11. An information processing apparatus, comprising:
a first memory for storing input values;
a second memory for storing desired output values;
a third memory for storing output values;
a plurality of function blocks each simulating a neuron by model of a neuron; and
a control circuit for controlling these components;
wherein said information processing apparatus is connected to a host computer;
each of said function blocks has a first function of outputting a value from a neuron model and a second function of computing a teacher signal for the neuron model and operates to perform either said first function or second function while said information processing apparatus operates; and
said host computer causes each of said function blocks to perform the first function or the second function, or designates an address thereof.

12. An information processing apparatus comprising:
a plurality of function blocks connected with at least one first data bus and at least one second data bus;
means for converting values supplied from said first data bus using a function and outputting results to said second data bus;
means for converting values from said first data bus using a derivative of said function and outputting results to said second data bus; and
means for controlling outputs from said function blocks to said first data bus;
wherein each of said function blocks comprises means for simulating a neuron by a model of the neuron, means for outputting an output from said function blocks to said first data bus and means for inputting a value to be output from said second data bus.

13. An information processing apparatus comprising:
a first network comprising:
a plurality of first function blocks for serving as an input layer, and
a plurality of second function blocks for serving as a hidden layer and an output layer, said first function blocks being connected with a first data bus, said second function blocks being connected with said first data bus and a second data bus,
wherein an output from each of said first function blocks and of said second function blocks being determined in the order of the input layer, the hidden layer and said output layer;
a second network comprising:
a plurality of third function blocks corresponding to said second function blocks in the hidden layer and the output layer which constitute said first network, wherein an output from each of said third function blocks being determined in the order of the output layer and the hidden layer;
means for converting a value output to said second data bus using a function and outputting a conversion result to said first data bus, means for outputting a value output to said second data bus, and means for converting a value output to said second data bus using a derivative of said function and outputting a conversion result to said first data bus;
each of said each of said second function blocks having means for holding a synapse weight of a model of a neuron, means for computing an inner product of said neuron model and means for modifying said synapse weight; and
each of said third function blocks having means for holding the synapse weight, means for computing a value necessary to said synapse weight and means for modifying said synapse weight, and holding the same synapse weight as the above synapse weight held by the corresponding second function block;
wherein after each of said second function blocks determines its output, the corresponding third function blocks inputs said output, after each of said third function blocks determines its output, the corresponding second function blocks inputs said output, and each of said second function blocks and each of said third function blocks modify individually their own synapse weights.

14. An information processing apparatus according to claim 13, wherein it is constructed on at least one sheet of wafer scale integrated circuit.

15. An information processing apparatus according o claim 13, wherein said first network is constructed on at least one sheet of first wafer scale integrated circuit whereas said second network is constructed on at least one sheet of second wafer scale integrated circuit.

16. An information processing apparatus according o claim 15, wherein said first wafer scale integrated circuit and said second wafer scale integrated circuit are designed in the same circuit construction.

17. An information processing apparatus according to claim 13, wherein said first function blocks and said second function blocks are designed in the same circuit construction.

18. An information processing apparatus, comprising;
a semiconductor integrated circuit;
a first memory for storing input values;
a second memory for storing desired output values;
a third memory for storing output values; and
control means for controlling these components, which are connected with one another through a data bus
wherein said semiconductor integrated circuit includes function blocks for simulating neurons by models of neurons;
each of said function blocks comprising means for transferring data to other corresponding function blocks, whereby synapse weights among said neuron models are modified for said plurality of input values and said desired output values corresponding thereto.

19. An information processing apparatus, comprising:
at least one wafer scale integrated circuit;
a first memory for storing input values;
a second memory for storing desired output values;
a third memory for storing output values; and
control means for controlling these components, which are connected with one another through a data bus;
wherein said wafer scale integrated circuit includes function blocks for simulating neurons by models of neurons, each of said function blocks comprising means for transferring data to the other function blocks, whereby synapse weights among said neuron models are modified for a plurality of input values and desired output values corresponding thereto.

20. An information processing apparatus, comprising:
at least one wafer scale integrated circuit;
a first memory for storing input values;
a second memory for storing desired output values;
a third memory for storing output values; and
control means for controlling these components, which are connected with one another through a data bus;
wherein said wafer scale integrated circuit includes a plurality of models of neurons for simulating neurons;
each of said function blocks includes means for transferring data to the other function blocks;
at least one function block constitutes a first hierarchical network wherein outputs therefrom are determined in the order of a hidden layer and an output layer and at least one function block constitutes a second hierarchical network wherein outputs therefrom are determined in the order of the output layer and the hidden layer;
said function block constituting said first hierarchical network and said function block constituting said second hierarchical network are in a one-to-one ratio so that synapse weights among said neuron models are modified for said plurality of input values and desired output values corresponding thereto.

21. An information processing apparatus according to claim 20, wherein said wafer scale integrated circuit is composed of a plurality of function blocks, and each of them is externally accessed by an absolute address physically determined and a logical address externally set.

22. An information processing apparatus according to claim 21, wherein two function blocks which are in a one-to-one ratio in said first and said second hierarchical network are set for a same logical address, and correspondence between these function blocks are decided in terms of their logical address.

23. An information processing apparatus, comprising:
a first memory for storing input values;
a second memory for storing desired output values;
a third memory for storing output values;
a plurality of function blocks each simulating a neuron by a model of a neuron and a control circuit for controlling these components;
wherein when a host computer connected with said information processing apparatus initializes the information processing apparatus to control operation thereof, the output from each of the neuron models is obtained, and said host computer does not operate while said information processing apparatus operates.

* * * * *